US011184505B2

(12) United States Patent
Nagano et al.

(10) Patent No.: US 11,184,505 B2
(45) Date of Patent: Nov. 23, 2021

(54) METHODS AND SYSTEM FOR POLICY-BASED PRINTING AND SCANNING

(71) Applicant: KYOCERA DOCUMENT SOLUTIONS, INC., Osaka (JP)

(72) Inventors: Daisaku Nagano, Pleasant Hill, CA (US); Hooman Rezvani, Pleasant Hill, CA (US); Tai Yu Chen, Dublin, CA (US); Jin Liang, Dublin, CA (US); Michael Ong Martin, Pacheco, CA (US)

(73) Assignee: Kyocera Document Solutions, Inc., Osaka (JP)

( * ) Notice: Subject to any disclaimer, the term of this patent is extended or adjusted under 35 U.S.C. 154(b) by 0 days.

(21) Appl. No.: 17/024,637

(22) Filed: Sep. 17, 2020

(65) Prior Publication Data

US 2021/0021733 A1 Jan. 21, 2021

Related U.S. Application Data

(63) Continuation-in-part of application No. 16/452,038, filed on Jun. 25, 2019, now Pat. No. 10,942,688, and a continuation-in-part of application No. 16/451,913, filed on Jun. 25, 2019, now Pat. No. 10,817,230, and a continuation-in-part of application No. 16/452,041, filed on Jun. 25, 2019, now Pat. No. 10,929,548.

(51) Int. Cl.
| | |
|---|---|
| *H04N 1/44* | (2006.01) |
| *H04N 1/00* | (2006.01) |
| *G06F 21/60* | (2013.01) |
| *H04L 29/06* | (2006.01) |

(52) U.S. Cl.
CPC ......... *H04N 1/4413* (2013.01); *G06F 21/608* (2013.01); *H04L 63/0853* (2013.01); *H04L 63/20* (2013.01); *H04N 1/00244* (2013.01); *H04N 1/00925* (2013.01); *H04N 1/4433* (2013.01)

(58) Field of Classification Search
CPC ............ H04N 1/4413; H04N 1/00244; H04N 1/00925; H04N 1/4433
USPC ....................................................... 358/1.14
See application file for complete search history.

(56) References Cited

U.S. PATENT DOCUMENTS

| | | | |
|---|---|---|---|
| 7,861,282 B2 | 12/2010 | Kakigi | |
| 9,069,599 B2 * | 6/2015 | Martinez | ................. H04L 12/66 |
| 9,461,820 B1 | 10/2016 | Dall | |
| 9,990,506 B1 * | 6/2018 | Brisebois | ................ G06F 21/62 |
| 2007/0107048 A1 | 5/2007 | Halls | |

(Continued)

*Primary Examiner* — Allen H Nguyen
(74) *Attorney, Agent, or Firm* — Millen, White, Zelano & Branigan, P.C.; William Nixon

(57) ABSTRACT

A policy-based system is implemented to allow access to a private domain to print using a public domain. The private domain includes private servers that store documents. The public domain includes servers and a printing device. A public policy server uses a domain list and a protocol connection with a private authentication server to validate a user and identify which private domain to access. The public policy server receives requests from the printing device to process a print job of a document in the private domain. The policy-based system also determines whether scanning operations for a document are allowed for a user at a scanning device. The private policy server determines policy values that are used to allow the scanning operations.

20 Claims, 14 Drawing Sheets

(56) References Cited

U.S. PATENT DOCUMENTS

| | | |
|---|---|---|
| 2007/0156659 A1 | 7/2007 | Lim |
| 2008/0034403 A1 | 2/2008 | Kakigi |
| 2009/0271839 A1 | 10/2009 | Kanai |
| 2010/0125891 A1* | 5/2010 | Baskaran .............. H04L 9/3263 726/1 |
| 2012/0110632 A1* | 5/2012 | Burghart ................ H04W 4/00 726/1 |
| 2013/0094053 A1 | 4/2013 | Shirai |
| 2014/0063531 A1 | 3/2014 | Deter |
| 2014/0283062 A1 | 9/2014 | Kamthe |
| 2015/0248258 A1 | 9/2015 | Ding |
| 2017/0251009 A1 | 8/2017 | Irimie |
| 2018/0376015 A1 | 12/2018 | Hokiyama |
| 2019/0004752 A1 | 1/2019 | Yamada |

* cited by examiner

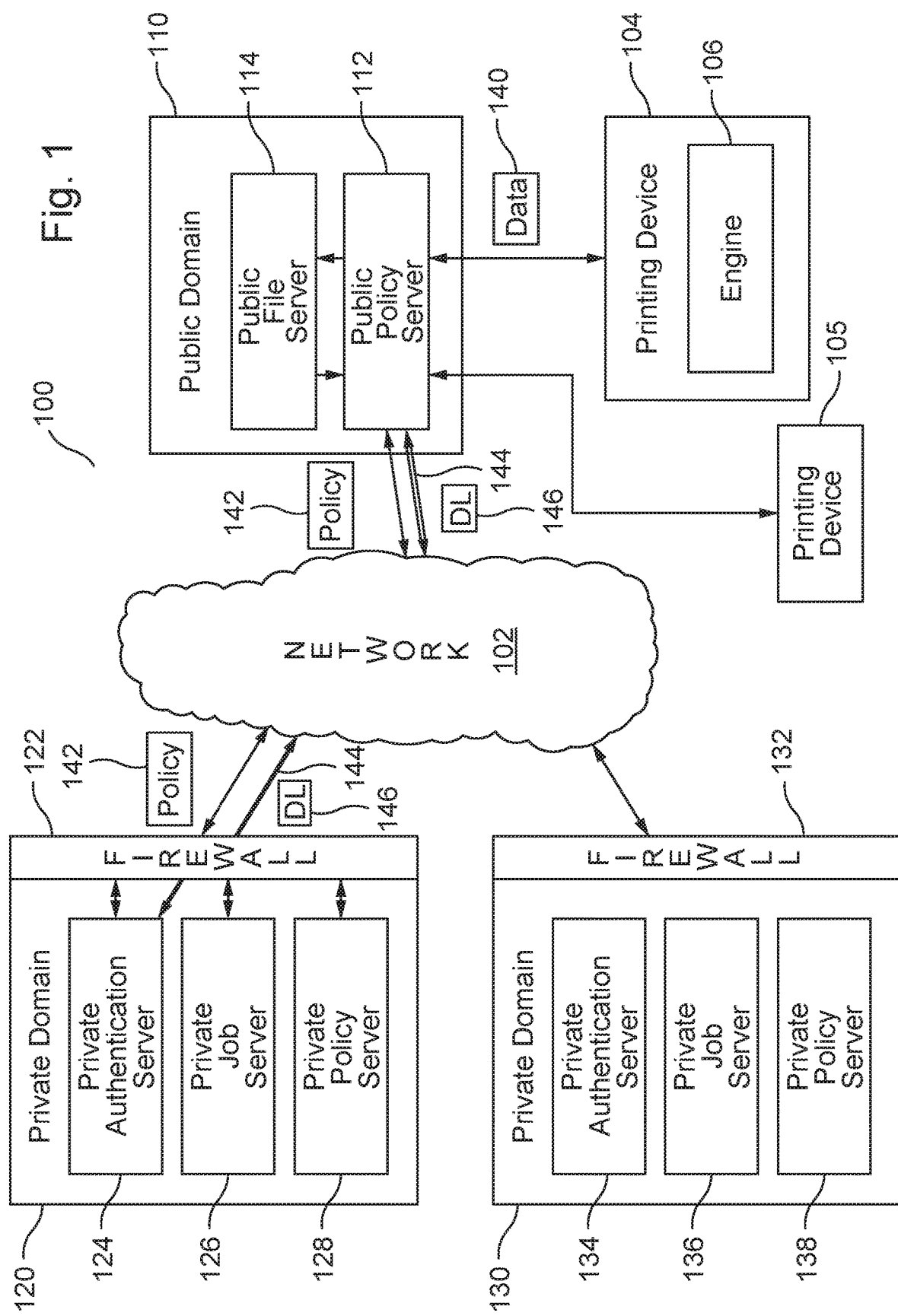

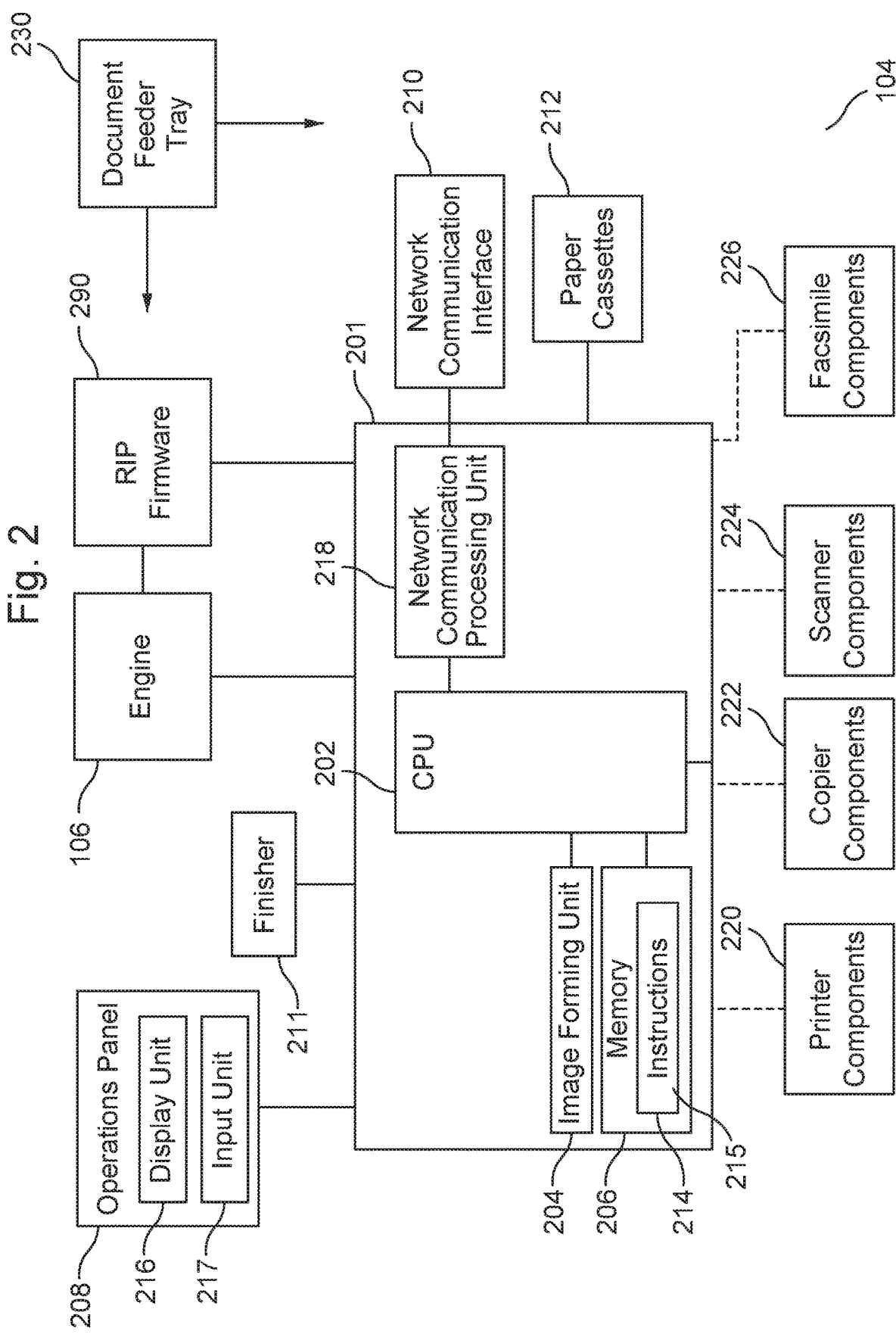

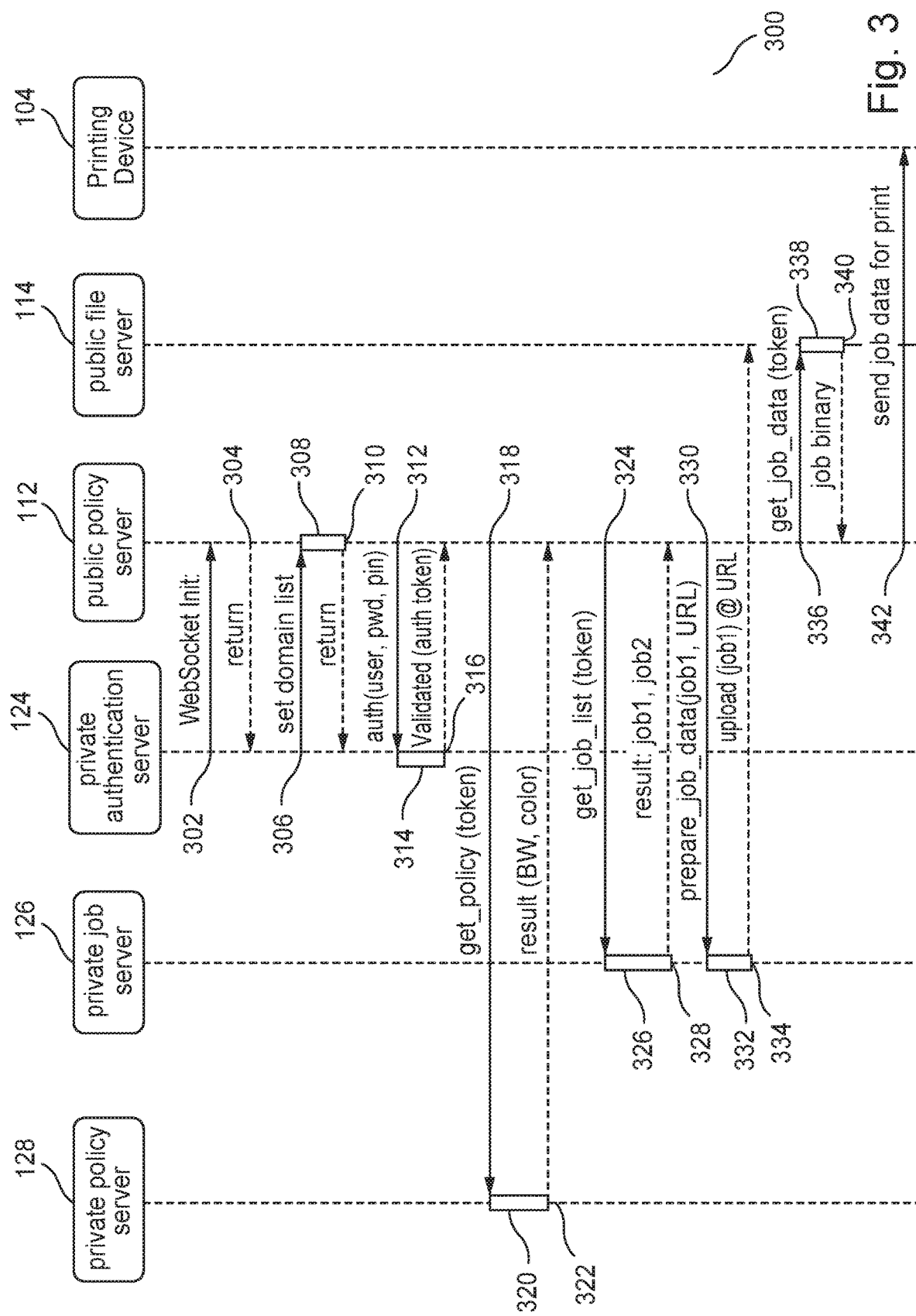

| | | |
|---|---|---|
| Private Domain 120 | @example1.com | 402 |
| | @example2.com | 404 |
| Private Domain 130 | @company.com | 406 |
| Private Domain N | @firm.com | 408 |
| Private Domain N+1 | @college.com | 410 |
| Private Domain X | @website.com | 412 |

METHODS AND SYSTEM FOR POLICY-BASED PRINTING AND SCANNING

FIELD OF THE INVENTION

The present invention relates to a method of using a system of private and public servers that implement policy-based printing operations. The system includes a public and private network that supports the policy used for printing operations, wherein the policy is implemented using a private server in the private network for printing and scanning operations.

DESCRIPTION OF THE RELATED ART

Existing policy-based printing and scanning systems mostly operate within a closed private domain environment. Print and scan data submitted by users may be only accessible within a single domain environment. Some users, such as on-the-go users including insurance and real estate agents, sales executives, lawyers, and company executives, require the capability to access printing data beyond an office environment. These users travel extensively and find themselves needing to print or scan documents in public locations, such as convenience stores, libraries, airports, copy and printing service stores, and the like. At these locations, the users may not reliably access the printing data. Further, these public locations may not support policy-based printing or scanning.

SUMMARY OF THE INVENTION

A policy-based scanning method is disclosed. The policy-based scanning method includes generating at least one policy value according to a policy stored at a private policy server. The policy corresponds to a user of a scanning device. The policy-based scanning method also includes sending the at least one policy value to a public policy server connected to the private policy server. The policy-based scanning method also includes requesting a scan job for a document at the scanning device connected to the public policy server. The policy-based scanning method also includes determining whether the scan job is allowed according to the at least one policy value. The policy-based scanning method also includes executing a scanning operation for the document at the scanning device if the scan job is allowed. The policy-based scanning method also includes generating an image file of the scanned document. The policy-based scanning method also includes storing the image file of the scanned document.

A policy-based scanning method is disclosed. The policy-based scanning method includes authenticating a user at a scanning device connected to a public policy server using a private authentication server. The policy-based scanning method also includes receiving an access token at the public policy server from the private authentication server based on the authentication of the user. The policy-based scanning method also includes providing the access token to a private policy server from the public policy server. The policy-based scanning method also includes generating at least one policy value for a scanning operation at the private policy server. The at least one policy value is based on a policy corresponding to the user. The policy-based scanning method also includes receiving the at least one policy value at the public policy server. The policy-based scanning method also includes receiving a request for the scanning operation at the scanning device. The policy-based scanning method also includes determining whether to allow the scanning operation of a document according to the at least one policy value. The policy-based scanning method also includes executing the scanning operation at the scanning device.

A policy-based scanning system is disclosed. The policy-based scanning system is configured to generate at least one policy value according to a policy stored at a private policy server. The policy corresponds to a user of a scanning device. The policy-based scanning system also is configured to send the at least one policy value to a public policy server connected to the private policy server. The policy-based scanning system also is configured to request a scan job for a document at the scanning device connected to the public policy server. The policy-based scanning system also is configured to determine whether the scan job is allowed according to the at least one policy value. The policy-based scanning system also is configured to execute a scanning operation for the document at the scanning device if the scan job is allowed. The policy-based scanning system also is configured to generate an image file of the scanned document. The policy-based scanning system also is configured to store the image file of the scanned document.

BRIEF DESCRIPTION OF THE DRAWINGS

Various other features and attendant advantages of the present invention will be more fully appreciated when considered in conjunction with the accompanying drawings.

FIG. 1 depicts a system to implement policy-based printing on a printing device according to the disclosed embodiments.

FIG. 2 illustrates a block diagram of components of the printing device used in conjunction with the authentication system according to the disclosed embodiments.

FIG. 3 illustrates a flow diagram for implementing a policy-based printing system according to the disclosed embodiments.

FIG. 4A illustrates a domain list for use within the policy-based printing system according to the disclosed embodiments.

DETAILED DESCRIPTION OF THE PREFERRED EMBODIMENTS

Figure 4B:
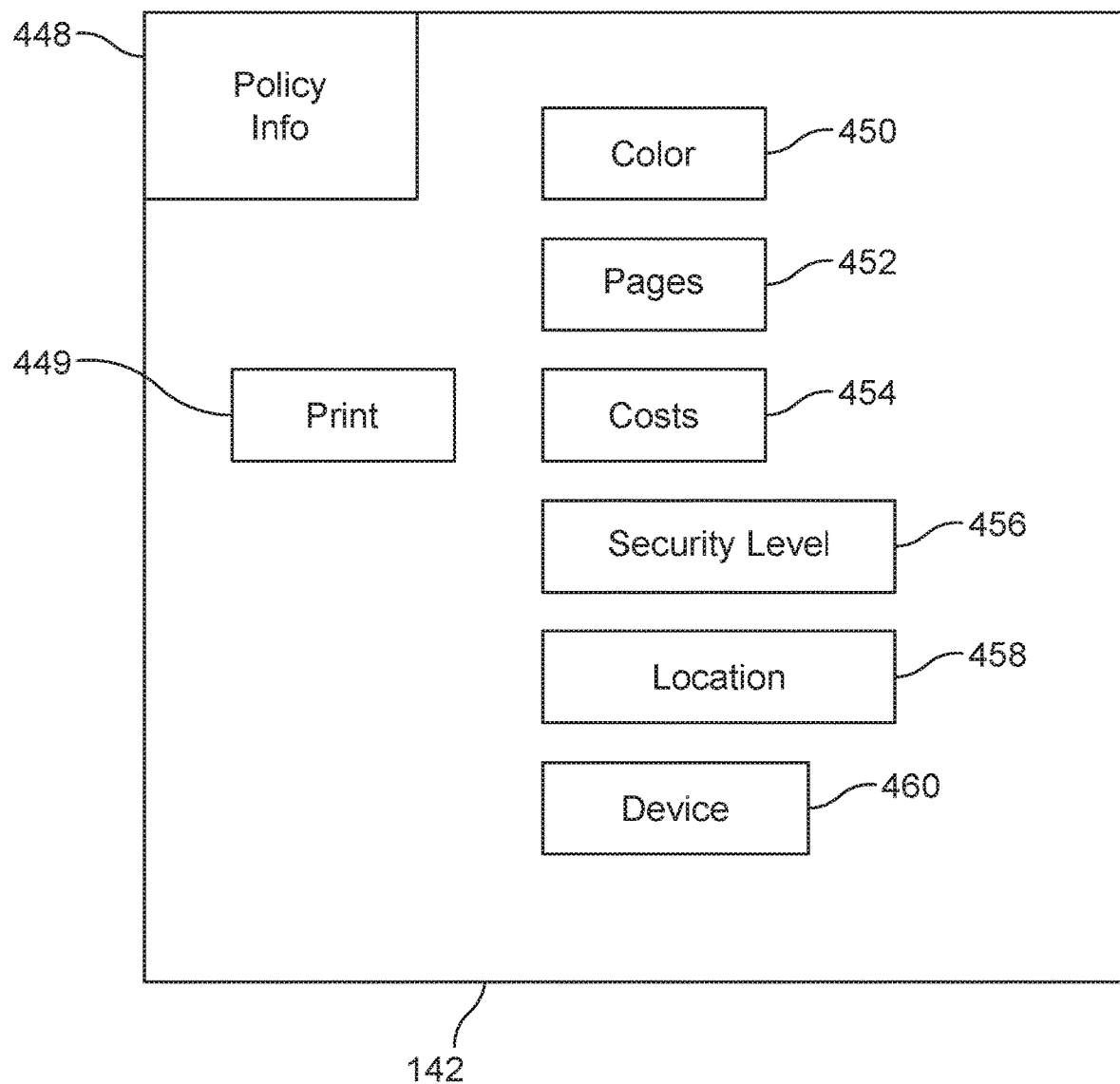
FIG. 4B illustrates a policy for use within the policy-based printing system according to the disclosed embodiments.
Figure 5:
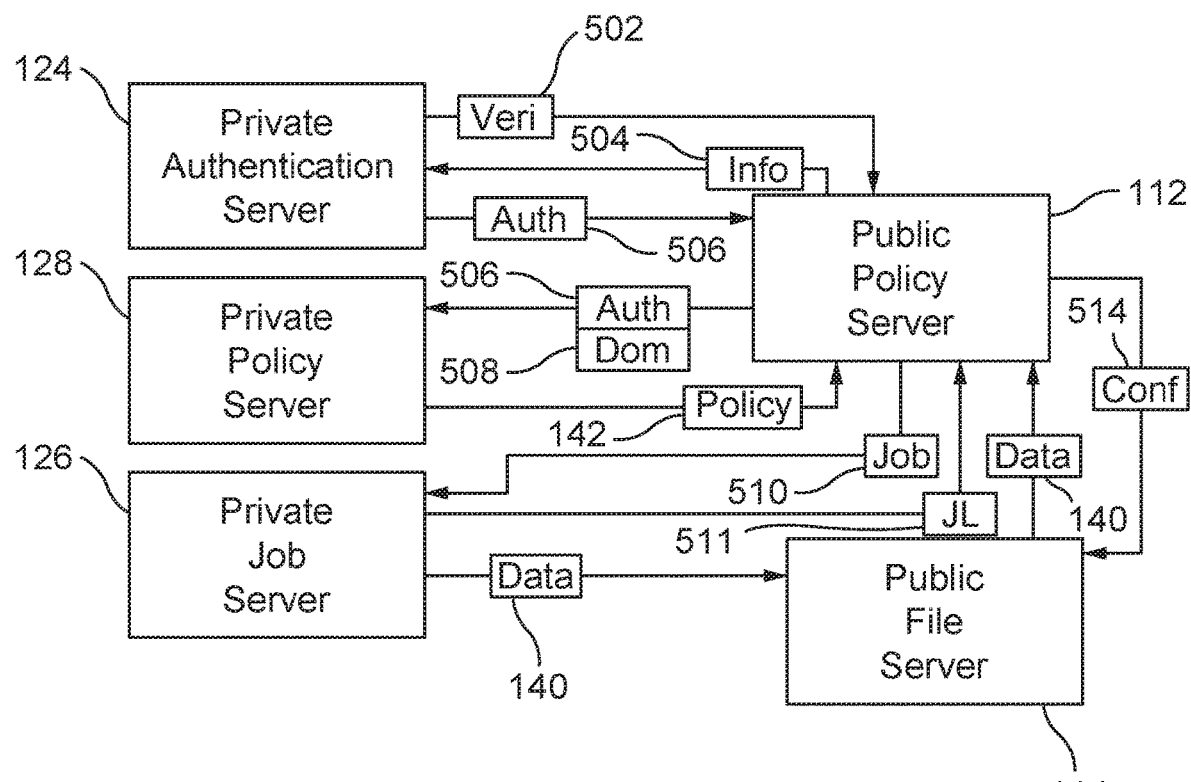
FIG. 5 illustrates a block diagram of servers and data used within the policy-based printing system according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments use an authentication server, a policy server, a file server, a network enabled printing device, and a public domain server. At the printing device, a user may provide authentication information, such as a username or password. The authentication information is transmitted from the device to a public domain server that processes the username for domain information. The domain information is matched to a domain on record and a private server is identified that can handle the domain authentication. The public domain server, through a direct connection to the private server, will go through a series of steps to obtain an authentication token, a policy applicable to the user, a job list of the user, and the job binary data for printing a print job on the printing device.

FIG. 1 depicts a system 100 to implement policy-based printing on a printing device 104 according to the disclosed embodiments. System 100 includes network 102 which exchanges data between the public and private domains within system 100. System 100 allows a user to retrieve a print job having job binary data 140 from a private domain server to print on printing device 104. Printing device 104 may be any device that processes the binary data to generate an electronic document that is then printed or accessed by the user. Printing device 104 also may be known as an image forming apparatus or a multi-functional printer. For example, printing device 104 may print on a sheet of paper the document generated from binary data 140. Alternatively, printing device 104 may display the electronic document to the user. Printing device 104 also may store the binary data for the print job. Printing device includes engine 106, which performs many of the operations to print, scan, store, modify, and the like. Printing device 104 and engine 106 are disclosed in greater detail below with reference to FIG. 2.

System 100 include public domain 110 and private domains 120 and 130. Public domain 110 may represent a collection of public servers and devices linked to network 102. In some embodiments, these servers are cloud servers. Public domain 110 also may be known as a public network of the public servers. Public domain 110 is accessible by printing device 104. Additional printing devices may connect to public domain 110, such shown by printing device 105. The printing devices may be located in public places, such as convenience stores, libraries, printing and copying stores and kiosks, and the like. Users may access the printing devices and, in turn, the servers within public domain 110. The users may need to validate their ability to access public domain 110 through a connected printing device.

Public domain 110 includes public policy server 112. Public policy server 112 interacts with private domains 120 and 130 as well as printing devices 104 and 105. Public policy server 112 may act as the middle man between public domain 110 and the private domains. Public policy server 112 may generate and store tokens used to implement the policy-based operations disclosed below. It also may store and allow access to a policy 142 received from a private domain, upon request. Policy 142, disclosed in greater detail below, outlines what a user can and cannot do when printing to printing device 104 from a private domain.

Public file server 114 is connected to public policy server 112. Public file server 114 may store or host binary data 140 for print job from a private domain. Printing device 104 may retrieve binary data 140 securely for a print job. In some embodiments, printing device 104 does so through public policy server 112. Public file server 114 also may receive binary data 140 from a server in a private domain, as disclosed below.

System 100 includes private domains 120 and 140. System 100 may include additional private domains, not shown here. Each private domain may include a plurality of private servers that are protected by a firewall from access from network 102. For example, private domain 120 includes firewall 122. Firewall 122 may be a software or hardware device that filters data and information coming over network 102 to private domain 120 for malicious or unauthorized access. If an incoming packet of data is flagged by the filters in firewall 122, then it is not allowed through to private domain 120. Firewall 132 may serve the same function for private domain 130.

Private domain 120 includes private authentication server 124, private job server 126, and private policy server 128. Private domain 130 includes private authentication server 134, private job server 126, and private policy server 128. The servers for private domain 120 are disclosed below, but their functionality may apply to the servers in private domain 130. Further, additional servers may be in a private domain and used securely to exchange information over network 102.

Private authentication server 124 is a private domain server that will provide authentication and authorize a user to prove his/her identify. Private authentication server 124 may be the main server that connects the private and public domain information exchange. In some embodiments, private authentication server 124 establishes a protocol connection 144 with public policy server 112 to provide a domain list 146 for access to private domain 120. Private authentication server 124 also verifies a user trying to access private domain 120 using public policy server 112.

Private job server 126 is a private domain server that stores all the binary data for the job files, or print jobs. When a user wants to print out a job file at printing device 104, private job server 126 should be queried in order to retrieve binary data 140 to generate the print job. Private job server 126 may forward binary data 140 to public file server 114 according to policy 142.

Private policy server 128 is a private domain server that hosts or stores all the policies, such as policy 142, related to a user. When printing device 104 attempts to perform any function, it should request private policy server 128 determine whether the user is allowed to do so. Private policy 128 may do the determination via public policy server 112.

The disclosed embodiments allow access to private servers from a public domain or to print on printing device 104 within a public network. An intranet application may do the authentication and job spooling so users need to authenticate printing device 104 before use. A policy may be associated with where a user can print, what kind of paper, number of pages, and the like. For example, some users may want to print from a public location, such as a convenience store, and want to access a private server that stores the print jobs. They would need access from network 102.

In some embodiments, public policy server 112 is a cloud server. Public policy server 112 may not be able to do accounting policy management to determine whether a user is allowed to print at printing device 104. Private domains 120 and 130 can operate over the cloud. Public policy server 112 may enforce the rules of the policy but management of the policy is still at a private server. Public policy server 112 also needs to distinguish between the private servers and private domains. Thus, if a user is outside the private network for a private domain, public policy server 112 will find the correct private domain to connect. That private domain will validate the user and access or use of the print job.

FIG. 2 illustrates a block diagram of components of printing device 104 used in conjunction with system 100 according to the disclosed embodiments. The architecture shown in FIG. 2 may apply to any multi-functional printer or image forming apparatus that scans documents to perform other functions, such as printing, storing, copying, and the like. As disclosed above, printing device 104 may send and receive data from public domain 110 and private domains 120 and 130.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 106 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the authentication operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter an identification code 138 generated by mobile application 110 into printing device 104.

Printing device 104 also includes network communication processing unit 218. Network communication processing unit 218 may establish a network communication, such as a wireless or wired connection with one or more other image forming apparatuses and a server in an image forming system. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 106. Engine 106 may be a combination of hardware, firmware, or software components that act accordingly to accomplish a task. For example, engine 106 is comprised of the components and software to print a document. It may receive instructions from computing platform 201 after user input via operations panel 208. Alternatively, engine 106 may receive instructions from other attached or linked devices.

Engine 106 manages and operates the low-level mechanism of the printing device engine, such as hardware components that actuate placement of toner onto paper. Engine 106 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 106 for actual rendering of an image and application of the toner onto paper during operations on printing device 104.

FIG. 3 depicts a flow diagram 300 for implementing policy-based printing system 100 according to the disclosed embodiments. In disclosing the embodiments shown by flow diagram 300, reference may be made to elements shown in FIGS. 1-2 and 4A, 4B, and 5. Flow diagram 300 shows the operations between the various servers disclosed in FIG. 1 above. Flow diagram 300 also depicts the actions taken at the various servers. The private and public servers may perform additional operations and actions not shown herein. The operations may be executed over network 102. Further, flow diagram 300 shows the operations between public domain 110 and private domain 120. Thus, firewall 122 may exist between the public servers and the private servers. The same operations may be executed between public domain 110 and private domain 130.

The processes disclosed by flow diagram 300 seek to solve the problem of how to authenticate a user in one location, such as a convenience store with printing services, that he/she is within an organization that has a policy applicable to the user. Further, the policy is stored in a private domain not readily accessible from the printing device at the convenience store. The printing device is connected to a public network and may be part of a public domain, such as public domain 110. The disclosed embodiments enable the user and the organization to implement the policy, which is applicable to the private domain, within the public domain of the printing device located in the convenience store.

Operation 302 executes by private authentication server 124 sending an initialization request to public policy server 112. As disclosed above, private authentication server 124 is within private domain 120 and public policy server 112 is within public domain 110. To send the initialization request, an administrator enter information about public policy server 112. Such information may include server network address, location, server capabilities, and the like. Once the information is entered, private authentication server 124 generates a verification token 502 which verifies that public policy server 112 is acceptable to receive information and communicate with the private authentication server.

Operation 304 executes by returning acceptance of the initialization request and establishing a protocol connection 144 between private authentication server 124 and public policy server 112. Protocol connection 144 may stay established as long as public policy server has verification token 502. Verification token 502 may be stored on public policy server 112 and presented whenever verification is required by private authentication server 124. Protocol connection 144 provides a persistent connection between private authentication server 124 and public policy server 112 that allows the servers to send data at any time. Protocol connection 144 preferably may be known as a WebSocket connection, which provides a full-duplex communication channel over a single connection. Preferably, protocol connection 144 uses a secure protocol.

Operation 306 executes by providing a domain list 400 from private authentication server 124 to public policy server 112. This operation also may include providing the information about the private authentication server. Action 308 executes by setting domain list 400 at public policy server 112 to include domain information for private authentication server 124. Public policy server 112 may refer to domain list 400 whenever a user attempts to print from a private domain. Public policy server 112 may use information provided by the user to determine which domain to obtain policy 142. For example, public policy server 112 may be connected to more than one private domain. Domain list 400 determines which private domain applies to a user trying to print.

FIG. 4A depicts an example domain list according to the disclosed embodiments. Domain list 400 may be a file having fields for the private domains and the email domains associated with each domain. A user is identified as part of a domain using his/her email address. Public policy server 112 will compare the email provided by the user to determine which private domain to access. As shown in FIG. 4A, private domain 120 may be associated with two email domains 402 and 404. A user having an email domain with "@example1.com" or "@example2.com" will have its policy and associated documents located on private domain 120. A user having an email domain 406 with "@company.com" will have its policy and associated documents located on private domain 130. Additional private domains may be served by public policy server 112. Private domain N will receive requests for policies of users having email domain 408 of "@firm.com" and private domain N+1 will receive requests for policies of users having email domain 410 of "@college.com."

As can be seen, companies, firms, and colleges have an interest in keeping their network domains private. Further, these entities may wish to limit use of printing devices within public domains according to a policy. Domain list 400 also may include an entry for a public domain, such as public domain X. In some instances, a public domain also may include policies to limit capabilities of a user on a printing device 104. These policies, however, may not be within a private domain and available for retrieving through a public network connection. An email domain of "@website.com" may direct public policy server 112 to a public domain for the associated policy 142. Referring back to FIG. 3, operation 310 returns an acknowledgement to private authentication server 124 that domain list 400 has been set and protocol connection 144 exists with public policy server 112.

Operation 312 executes when a user wants to print a document at printing device 104 coupled to public policy server 112. Authentication information 504 is provided from public policy server 112 to private authentication server 124. In some embodiments, the user enters a username and password that is captured by public policy server 112. For example, the user may enter this information at printing device 104 which forwards it to public policy server 112. Alternatively, the user may connect to public policy server 112 through an application on a mobile device or the like to provide authentication information 504.

In other embodiments, the user may enter a code, such as a personal identification number (PIN), that retrieves this information to provide it to public policy server 112. Public policy server 112 receives the code and matches the user information when the code is provided. Other embodiments may use a graphical code or identification card having a number that provides this information. Operation 312 sends this authentication information 504, such as username, password and PIN, to private authentication server 124.

Action 314 executes by authenticating the user with authentication information 504. Thus, user information is not stored on public policy server 112. Authentication still occurs in private domain 120 behind firewall 122. If the user is authenticated, then action 314 also includes private authentication server 124 generating authentication token 506. Operation 316 executes by indicating that the user has been validated and providing authentication token 506 to public policy server 112. Public policy server 112 may assign authentication token 506 to the user. Using the PIN example, the entered PIN may be associated with authentication token 506.

Private authentication server 124 also may provide an email address or the email domain, such as email domains 402-412 shown in FIG. 4A, to public policy server 112 if this information is not already available. For example, it may be too cumbersome to enter email addresses at printing device 104. Further, the administrators of private domain 120 may not want valid email addresses being entered at printing device 104 on a public network or in a public place. Thus, no email address is provided to public policy server 112 from within public domain 110 but, instead, from private domain 120. Moreover, private authentication server 124 may provide only the domain and not the actual email address.

Once validated, public policy server 112 now retrieves a policy 142 from private policy server 128. Operation 318 executes by getting policy 142. The email domain is compared against domain list 400 to determine which private domain to query for the policy. In this example, user@example1.com is the email provided to public policy server 112. It compares the email to domain list 400 to determine the applicable policy is within private domain 120. Public policy server 112 sends determined domain 508, such as example1.com, along with authentication token 506 to private policy server 128 in operation 318. If the next user has an email domain of @company.com, then public policy server 112 determines that domain 508 is company.com and that the applicable policy is located in private domain 130.

Action 320 executes by identifying policy 142 as being applicable to the user based on domain 508. Authentication token 506 may be associated with the user and this information provided from private authentication server 124. Policy 142 may be a file having flags or other information to indicate what the user can do within a public network. For example, limitations may be set as to what type of printing can be done, the number of pages may be printed, and the like. FIG. 4B depicts a block diagram of an example policy for policy 142 according to the disclosed embodiments.

Policy 142 may include policy information 448. Policy information 448 may include a title of the policy, document information, and private domain information. Policy 142 includes data, such as flags, that indicates what can and cannot be performed in public domain 110. This data may be known as parameters in policy 142. Examples of parameters that limit printing operations are shown in FIG. 4B. Print parameter 449 may be set to indicate whether a user can even print outside private domain 120. Certain users may not be allowed to print in a public domain. Print parameter 449 may be set to limit these users to scanning documents only or other operations that do not allow access to any documents or information stored in private domain 120.

Color parameter 450 may indicate whether the user can do color printing in public domain 110. If no, then the user may be limited to only black and write printing. The user may be allowed to do color printing at printing devices in private domain 120 but not allowed to do so in a public domain setting.

Pages parameter 452 may set a limit on the number of pages that a user can print. The administrators of private domain 120 do not want unlimited printing to occur outside the private domain. Pages parameter 452 may limit the number of pages printed per day, week, month, hour, year, and the like. Alternatively, pages parameter 452 may cap the number of pages printed to have the user check with the administrators of public domain 120 to reset this parameter. Once the user hits a limit, he/she requests that the number of pages printed be reset to allow further operations. Costs parameter 454 may be similar to pages parameter 452 except to limit the amount of fees that the user may incur before printing is stopped. Costs parameter 454 helps prevent the user from running up large bills at a convenience store. It also may cap the amount of costs incurred on a periodic basis or as a total cost.

Security level parameter 456 may indicate that the user can only access documents from a job list provided from private job server 126 having a certain security or access level. Security level parameter 456 may help prevent accidental or intentional printing of sensitive documents at printing device 104. Further, the user may have access to sensitive documents when printing within private domain 120 but not so when printing using public domain 110. Policy 142 may limit exposure to such documents.

Location parameter 458 may indicate whether the user can print at certain locations. Policy 142 may place geographic or other limitations on where the user can print using a public domain. Location parameter 458 also may indicate the type of locations to allow printing operations. For example, the administrators of private domain 120 may not allow printing in a convenience store but may allow printing in a library. Device parameter 460 may act similar to location parameter 458 except limit printing on certain devices. For example, policy 142 may not allow printing on a printing device 104 that does not have legal sized paper capability or stores the data from the job file in a memory on the device. Device parameter 460 also may limit printing operations to known printing devices having a serial number or IP address.

Operation 322 executes by providing policy 142 to public policy server 112. Public policy server 112 may configure policy 142 to determine whether the user can print using public domain 110 and what limits on the printing operations may be enforced. Policy 142 may apply to all users of private domain 120. Alternatively, policy 142 may treat users differently. Some users may have unlimited printing privileges according to parameters 452 or 454 while others are prevented from exceeding a cap set forth by these parameters. Public policy server 112 configures the determinations using policy 142 accordingly.

Using the parameters within policy 142, operation 324 executes by getting a job list from private job server 126. Public policy server 112 may generate a job token 510. Job token 510 is presented to private job server 126 to obtain a job list 511 of print jobs available to the user. In some embodiments, job token 510 may include data that specifies what print jobs can be added to job list 511 based on the parameters set forth in policy 146. Job list 511 includes those print jobs that meet the specifications of policy 146. For example, color print jobs will not be included in job list 511 of policy 146 does not allow color printing for the user in a public domain. Action 326 executes by generating job list 511 in response to job token 510. Operation 322 executes by sending the print jobs in job list 511 to public policy server 112 from private job server 126.

The user then may select a print job from job list 511. The user may select from an interface provided on printing device 104 that is then communicated to public policy server 112. Alternatively, an application may execute on a device of the user that presents the job list and allows for selection from the list. The selection is sent to public policy server 112. Operation 330 executes by sending a command to private job server 126 to prepare a selected print job along with a uniform resource locator (URL) address from public policy server 112. The URL address is one associate with public policy server 112 and accessible from public domain 110.

Action 332 executes by retrieving and preparing the data for the print job. Preferably, the data is binary data that represents the document for the print job. This may be shown as binary data 140 in FIGS. 1 and 5. Action 332 also may convert the data into a format compatible with printing device 104. For example, the document may include data that calls for printing on a legal sized paper while printing device 104 only prints using letter sized paper. The data sent from private job server 126 may be modified to fit onto a letter sized paper.

Operation 334 executes by uploading binary data 140 to the URL address provided in operation 330. Thus, private job server 126 puts the data for the print job outside private domain 120 for the first time at this point. The URL address may be valid for only a specified period of time, such as two hours, one day, a week, and the like. After that point, the URL address may expire. The URL address to download binary data 140 for the print job is provided to public file server 114.

Public policy server 112 now retrieves binary data 140 and sends the data to printing device 104. Before that occurs, however, the disclosed embodiments may confirm whether the user has enough funds to pay for processing and completing the print job. Operation 336 executes by generating a confirmation token 514 at public policy server 112 once it is confirmed that the user or user's account has enough money to cover expenses to print. Public policy server 112 may compare the funds available to the cost to complete the print job. If there are enough funds, then confirmation token 514 is generated and sent to public file server 114. If not, then the user may be alerted to add more funds to his/her account.

Action 338 executes by obtaining uploaded binary data 140 from the URL address. Public file server 114 may send a call to the URL address which then sends binary data 140 to the public file server. Public file server 114 may store binary data 140 until confirmation token 514 is received. If a confirmation token 514 is not received within a specified time frame, then binary data 140 may be deleted from public file server 114. This feature prevents print jobs from private domain 120 from being stored indefinitely in public domain 110. Other factors may be used to determine when to delete any stored files of binary data.

Operation 340 executes by sending binary data 140 for the print job from public file server 114 to public policy server 112. Operation 342 executes by sending binary data 140 from public policy server 112 to printing device 104. Printing device 104 may process the print job accordingly. The user's account for printing on public domain 110 may be charged accordingly as well. In some embodiments, public file server 114 may send binary data 140 to printing device 104.

The disclosed embodiments allow a private domain, or network, to print to a public domain using a policy applicable to the public domain. Internal policies to the private domain are not material to printing in the public domain. Further, job data is kept private as long as possible. The data for the print job is provided to the public domain when requested by the user and approved according to the policy. This feature allows the user to print anywhere. The print job is not automatically sent outside the private domain or from the private servers until printing actually occurs. The disclosed embodiments provide greater flexibility for companies and users to access documents in a secure, private location and use devices and resources in a public setting.

Figure 6:
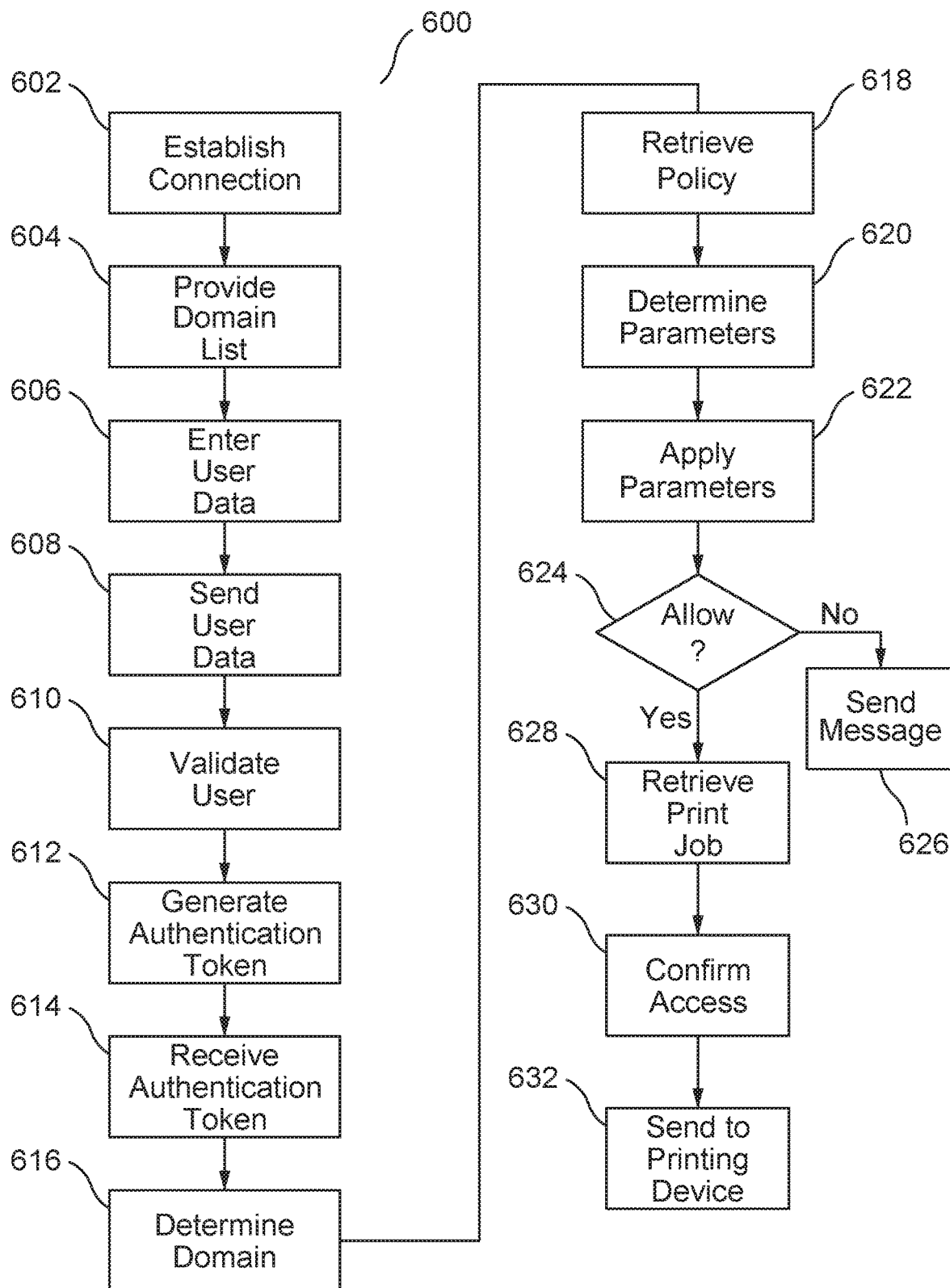
FIG. 6 illustrates a flowchart for printing at a printing device within the policy-based printing system according to the disclosed embodiments.

FIG. 6 illustrates a flowchart 600 for printing at printing device 104 within policy-based printing system 100 according to the disclosed embodiments. Flowchart 600 may refer back to elements disclosed in FIGS. 1-5 for illustrative purposes. The embodiments disclosed by flowchart 600, however, are not limited to the features disclosed in FIGS. 1-5. Further, flowchart 600 may compliment the embodiments disclosed by flow diagram 300.

Step 602 executes by establishing a protocol connection 144 between private authentication server 124 and public policy server 112. The protocol connection allows communication between the servers, one in private domain 120 and another one in public domain 110. Step 604 executes by providing a domain list 146 from private authentication server 124 to public policy server 112. Domain list 146 may include applicable private domains and associated email domains that are accessible by public policy server 112. Step 606 executes by entering user data 504 within public network 110 and providing the data to public policy server 112. Step 608 executes by sending user data 504 to private authentication server 124.

Step 610 executes by validating the user at private authentication server 124. Private authentication server 124 checks the provided user data 504 against its stored authentication records for the user. If the user is validated, then step 612 executes by generating authentication token 506. Step 614 executes by receiving authentication token 506 at public policy server 112. Step 616 executes by determining the applicable private domain for the user according to domain list 146. Preferably, public policy server 112 uses the email address for the user to determine which private domain to access for the policy for the user.

Step 618 executes by retrieving policy 142 from private policy server 128 based on the receipt of authentication token 506 and domain 508 from public policy server 112. Private policy server 128 is identified according to the applicable domain 508 and queried by public policy server 112. Once verified, private policy server 128 sends policy 142 to public policy server 112.

Step 620 executes by determining the parameters for policy 142. This process is disclosed above. As shown in FIG. 4B, policy 142 may include parameters that outline what printing options are available to the user. Step 622 executes by applying the parameters to configure public policy server 112 to determine what print jobs or operations are available to the user in public domain 110.

Step 624 executes by determining whether the user is allowed to access printing device 104 using public domain 110 according to the policy. Further, step 624 determines what print jobs are available to the user according to policy 142. The determination also may include reviewing policy 142 for allowing other operations on printing device 104 such as scanning, editing, faxing, and the like. If no, then step 626 executes by sending a message to the user or public policy server 112 that the operation on printing device 104 is not allowed.

If step 624 is yes, then step 628 executes by retrieving the print job from private job server 126. A job list 511 may be provided. The print job is selected from job list 511. Job token 510 is generated by public policy server 112. Public policy server 112 sends job token 510 to private job server 126 to obtain job list 511. Upon selection of the print job, private job server 126 uploads binary data 140 for the print job to a location accessible by public file server 114. Step 630 executes by confirming access to binary data 140 for the print job by checking to see if the user has enough money to pay for using printing device 104. Other restrictions also may be checked, such as time of day, location, and the like, to confirm whether the print job should be released to printing device 104.

Step 632 executes by sending binary data 140 to printing device 104 upon confirmation in step 630. Public policy server 112 generates a confirmation token 514 to confirm that the user is allowed to print. Public policy server 112 may send confirmation token 514 to public file server 114. Upon receipt of the confirmation token, public file server 114 may forward binary data 140 for the print job to public policy server 112, which provides the data file to printing device 104.

Figure 7:
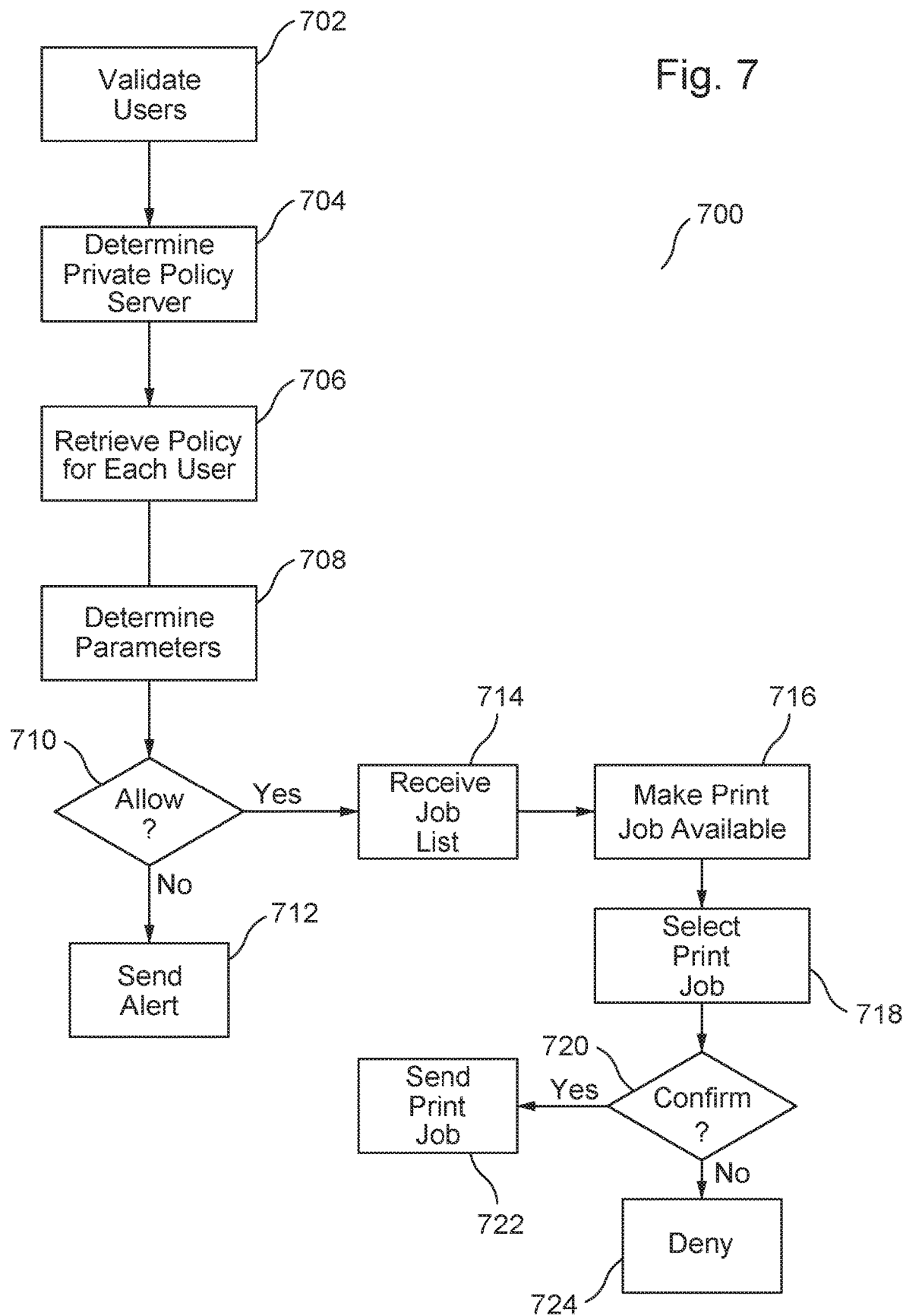
FIG. 7 illustrates a flowchart for implementing a policy-based printing system in a public domain according to the disclosed embodiments.

FIG. 7 illustrates a flowchart 700 for implementing a policy-based printing system 100 in a public domain 110 according to the disclosed embodiments. Flowchart 700 may refer back to elements disclosed in FIGS. 1-5 for illustrative purposes. The embodiments disclosed by flowchart 700, however, are not limited to the features disclosed in FIGS. 1-5. Further, flowchart 700 may compliment the embodiments disclosed by flow diagram 300.

As disclosed above, public policy server 112 may interact with a plurality of private domains. Public policy server 112 may retrieve and implement more than one policy for printing or processing print jobs in public domain 110. In some embodiments, public policy server 112 may implement policies for a plurality of public domains as well. Further, a plurality of printing devices may be connected to public policy server 112. Flowchart 700 discloses some embodiments that have public policy server 112 interacting with more than one private domain.

Step 702 executes by validating users within public domain 110 at private authentication server 124. As disclosed above, a protocol connection may be established between public policy server 112 and private authentication server 124 to exchange user information to perform the validation.

Step 704 executes by determining a private policy server for each user according to a domain for the user at public policy server 112. The domains for each user are private domains. Preferably, the email domain for each user indicates the applicable private domain for that user. With two or more users, different email domains may indicate more than one private domain. Step 706 executes by retrieving a policy 142 for each user according to the respective domain from private policy server 128.

Step 708 executes by determining the parameters for each policy 142. All of the policies are received at public policy server 112. Public policy server 112 configures the treatment of printing requests for each private domain according to the corresponding policy. The policy sets forth the parameters for printing from the private domain via the public domain. For example, the parameters for one policy may only allow 100 pages to be printed per user a month from private domain 120 while the parameters for another policy may only allow 20 pages to be printed per user from private domain 130. Public policy server 112 is configured accordingly.

Step 710 executes by determining whether the user is allowed to print according to the applicable policy. If no, then step 712 executes by sending an alert to public policy server 112 or to the user. No printing operations using public domain 110 are allowed. If yes, then step 714 executes by receiving a job list according to the applicable policy from private job server 126. Step 716 executes by making the print jobs in the job list available to the user. Step 718 executes by selecting a print job from the job list. Binary data 140 for the selected print job is retrieved from private job server 126 and made available to public file server 114.

Step 720 executes by confirming whether the print job may be sent to printing device 104. Public policy server 112 confirms that the user has enough funds or credits to perform the request task on printing device 104. If yes, then step 722 executes by sending the print job as binary data 140 to printing device 104. If no, then step 724 executes by denying the print job. The user may be prompted to provide additional funds or credits to perform the requested task.

Figure 8:
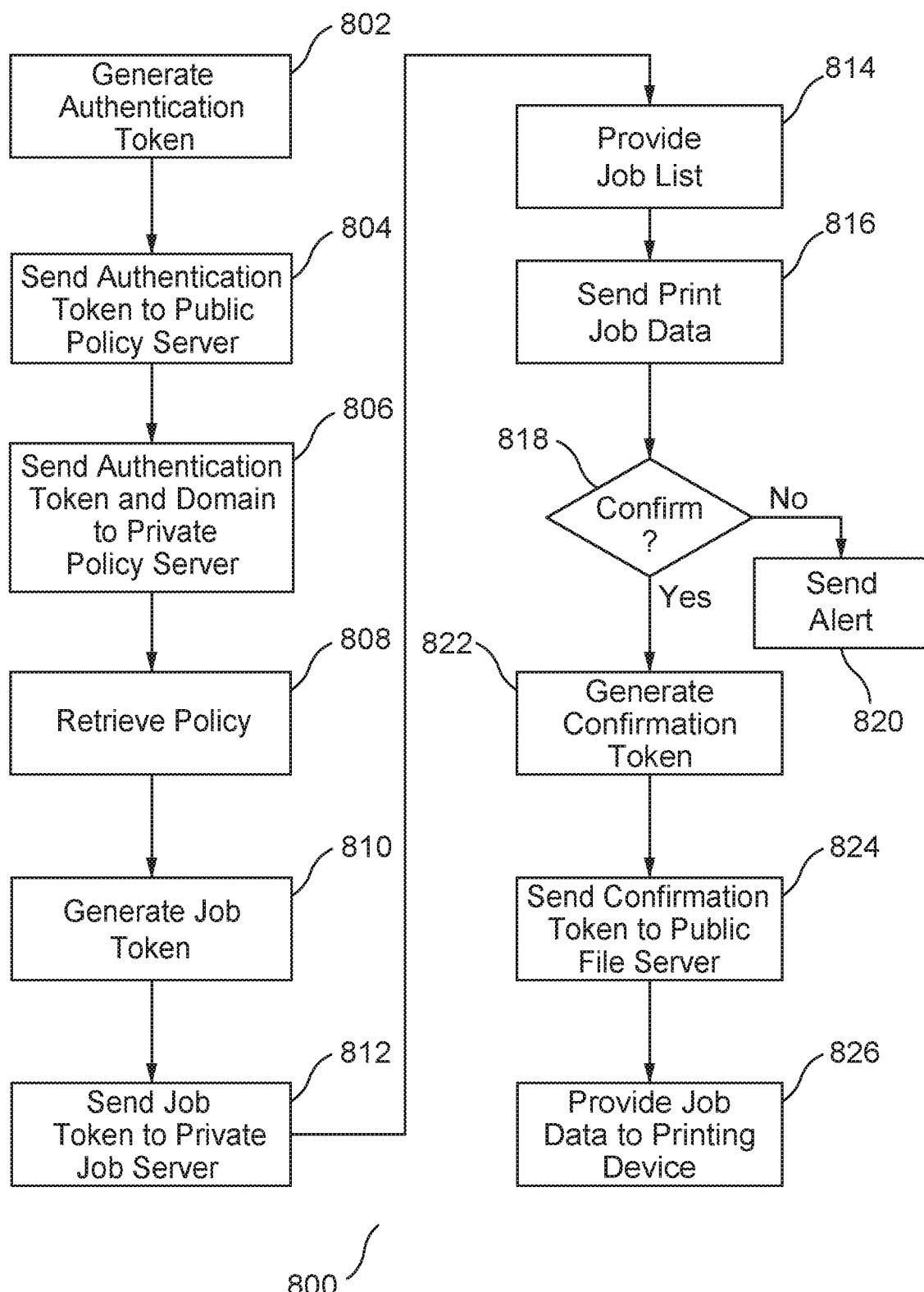
FIG. 8 illustrates a flowchart for implementing a policy-based printing system using tokens according to the disclosed embodiments.

FIG. 8 depicts a flowchart 800 for implementing a policy-based printing system 100 using tokens according to the disclosed embodiments. Flowchart 800 may refer back to elements disclosed in FIGS. 1-5 for illustrative purposes. The embodiments disclosed by flowchart 800, however, are not limited to the features disclosed in FIGS. 1-5. Further, flowchart 800 may compliment the embodiments disclosed by flow diagram 300.

Step 802 executes by generating authentication token 506 at private authentication server 124. This step occurs once private authentication server 124 validates a user attempting to print using public domain 110. Public policy server 112 sends user information 504 including an email address, username, password, or PIN to private authentication server 124. Private authentication server 124, being in private domain 120, may securely store this information for the user. The secure user information is not made available in public domain 110. Authentication token 506 indicates that the user may access private domain 120. Step 804 executes by sending authentication token 506 to public policy server 112.

Step 806 executes by sending authentication token 506 and domain 508 to private policy server 128. Public policy server 112 sends authentication token 506 and domain 508 after the domain is determined using domain list 146. An email address may indicate an email domain that is used as domain 508. Domain 508 indicates which private domain to access for the applicable policy. For example, referring to FIG. 4A, an email of user@example1.com will indicate private domain 120. Public policy server 112 attaches authentication token 506 to domain 508 and sends the request for the policy for the user.

Step 808 executes by retrieving policy 142 from private policy server 128. Authentication token 506 confirms that the user corresponds to the policy. Authentication token 506 may include data provided by private authentication server 124 that identifies the user as able to use private domain 120 and, therefore, policy 142 for the private domain should be used in printing on public domain 110. Private policy server 128 sends policy 142 to public policy server 112. Public policy server 112 then configures itself to apply the parameters of the policy to using public domain for the user.

Step 810 executes by generating job token 510 at public policy server 112 after applying the parameters of policy 142. The parameters may detail what the user can do using public domain 110. These parameters may not necessarily correspond to what the user can do using private domain 120. Limitations are placed on the user on how he/she can use printing device 104. Job token 510 may reflect the parameters to compile the job list of print jobs available to the user according to policy 142.

Step 812 executes by sending job token 510 to private job server 126. Private job server 126 may store the print jobs available to the user or to users in private domain 120. In some embodiments, a plurality of print jobs may be available such that a job list 511 is generated based on the parameters for the user in using public domain 110. Job token 510 may be used in generating job list 511 in that it includes information to select the appropriate print jobs to include in the print job list.

Step 814 executes by providing print job list 511 to public policy server 112. The user may select a print job from print job list 511. Alternatively, the desired print job may already be selected such that public policy server 112 receives data for the selection, such as from an application on a mobile device, that corresponds to the print job in job list 511. Public policy server 112 then requests the print job data from private job server 126. Step 816 executes by sending job binary data 140 for the selected print job from private job server 126 to public file server 114.

Step 818 executes by confirming whether the user may print or process the print job at printing device 104. For example, public policy server 112 may confirm that the user has enough funds in an account to pay for printing on printing device 104. If step 818 is no, then step 820 executes by sending an alert to the user or to public policy server 112 that printing operations are to be stopped until the condition is met. Using the above example, the user may be asked to provide additional funds to his/her account to print the document.

If step 818 is yes, then step 822 executes by generating confirmation token 514 by public policy server 112. Confirmation token 514 indicates that the processing of binary data 140 at printing device 104 may proceed. Step 824 executes by sending confirmation token 514 to public file server 114 to obtain binary data 140, which is stored thereon. Public file server 114 may send binary data 140 to public policy server 112 upon receipt of confirmation token 514.

Step 826 executes by providing binary data 140 to printing device 104. Public policy server 112 may send binary data 140 once a connection is established with printing device 104. Public policy server 112 may have to wait until printing device 104 is available before forwarding binary data 140. Thus, the data from private job server 126 is not made available on printing device 104 until the operations are ready to commence. Although the current embodiments discuss printing on printing device 104, other operations also may occur, such as scanning, editing, faxing, and the like.

Figure 9:
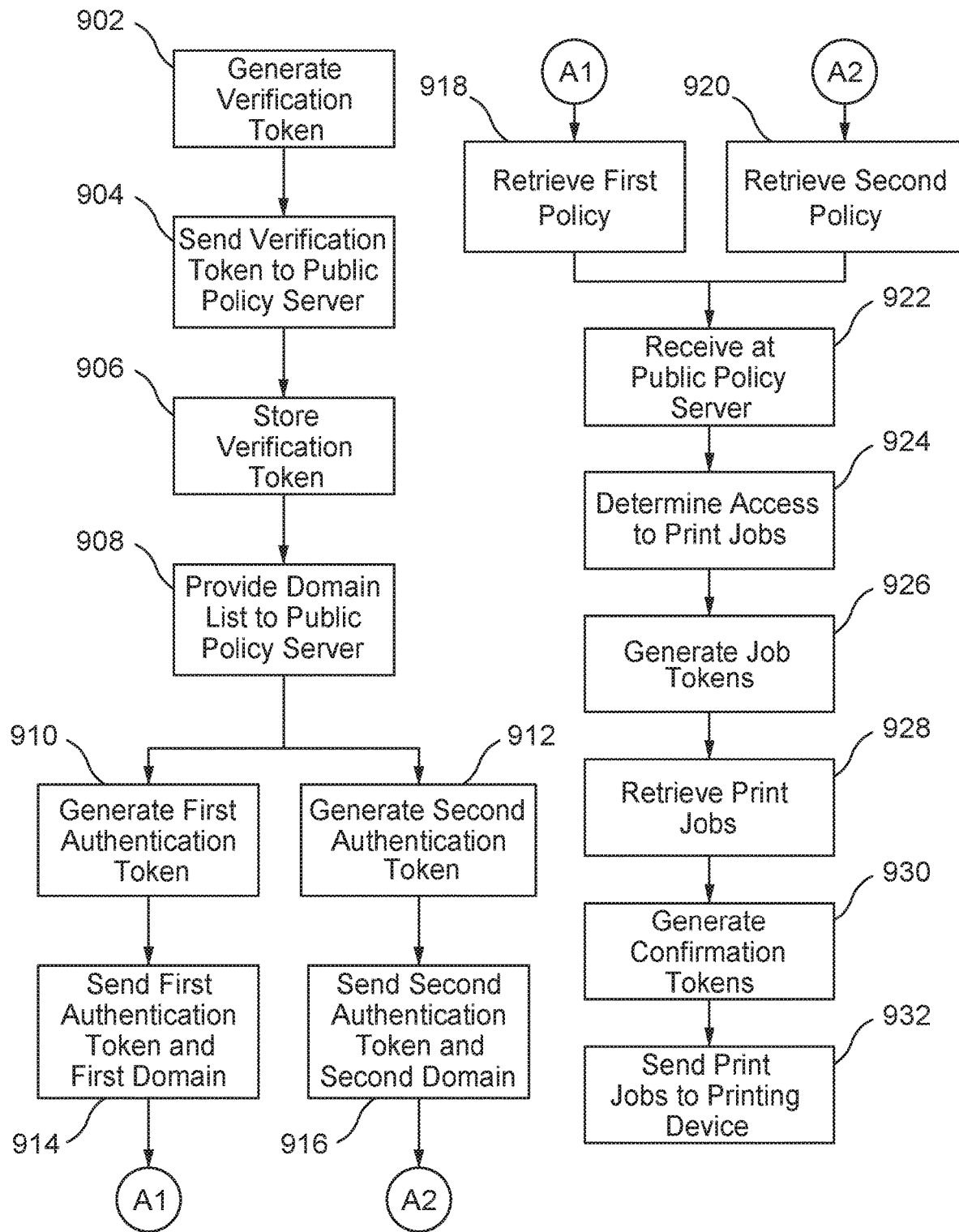
FIG. 9 illustrates a flowchart for selecting a plurality of print jobs from a plurality of private domains for printing in a public domain according to the disclosed embodiments.

FIG. 9 depicts a flowchart 900 for selecting a plurality of print jobs from a plurality of private domains 120 and 130 for printing in public domain 110 according to the disclosed embodiments. Flowchart 900 may refer back to elements disclosed in FIGS. 1-5 for illustrative purposes. The embodiments disclosed by flowchart 900, however, are not limited to the features disclosed in FIGS. 1-5. Further, flowchart 900 may compliment the embodiments disclosed by flow diagram 300.

As disclosed above, different policies apply to different to users and prints jobs from different private domains. One private domain may not allow color printing while another private domain may not allow unlimited printing. Thus, public policy server 112 configures itself to resolve the different requirements set forth in a plurality of policies from various private policy servers. Further, public policy server 112 may manage different job lists and print jobs from the plurality of private domains. Alternatively, a private domain may have different domains related to it, such as example1.com and example2.com for private domain 120 shown in FIG. 4A. Different policies may come from a single private policy server.

Step 902 executes by generating verification token 502 at private authentication server 124. Private authentication server 124 receives information about public policy server 112 in order to establish a protocol connection. Verification token 502 helps to establish a connection between private authentication server 124 and public policy server 112. Private authentication server 134 also may generate a verification token 502 to establish protocol connection to public policy server 112.

Step 904 executes by sending verification token 502 to public policy server 112. Step 906 executes by storing verification token 502 at public policy server 112. As long as public policy server 112 can present verification token 502 when requested or when submitting a print request for a user, the connection is established with private authentication server 124. Step 908 executes by providing domain list 146 from private authentication server 124 to public policy server 112. Domain list 146 may include information pertaining to a plurality of domains for a plurality of private domains, as disclosed by FIG. 4A.

Step 910 executes by generating a first authentication token 506. Step 912 executes by generating a second authentication token 506. The first authentication token may be generated in response to a first user providing user information at public policy server 112. The second authentication token may be generated in response to a second user providing user information at public policy server 112. Public policy server 112 may access the appropriate private authentication server to validate the user information for each user. In some embodiments, private authentication server 124 may validate both users and generate both authentication tokens. Alternatively, private authentication server 124 may generate the first authentication token while private authentication server 134 may generate the second authentication token. Public policy server 112 may have instructions when to use the different private authentication servers.

Step 914 executes by sending the first authentication token and a first domain to a first private policy server. Step 916 executes by sending the second authentication token and a second domain to a second policy server. Public policy server 112 determines which private domain is applicable to each user. The determination of the private domain may be based on the email address for each user. In some embodiments, public policy server 112 may send this data to a single private policy server, which stores different policies for different domains that use a single private domain. Alternatively, the authentication tokens and domains may be sent to separate private policy servers. For example, the first authentication token and first domain are sent to a first private policy server, such as private policy server 128. The second authentication token and the second domain are sent to a second private policy server, such as private policy server 138.

Flowchart 900 proceeds to steps A1 and A2 for steps 914 and 916, respectively. Steps A1 and A2 then proceed to steps 918 and 920, respectively. Step 918 executes by retrieving a first policy, such as policy 142, in response to the first authentication token and the first domain. Step 920 executes by retrieving a second policy, such as policy 142, in response to the second authentication token and the second domain. In some embodiments, the first policy is stored on private policy server 128 and the second policy is stored on private policy server 138. Alternatively, both policies may be stored on private policy server 128 or 138. The first policy may apply to the first user and the second policy may apply to the second user.

Step 922 executes by receiving the first and second policies at public policy server 112. Step 924 executes by determining access to a first print job according to the first policy and access to a second print job according to the second policy. Public policy server 112 may configure the parameters of each policy to determine what type of print jobs may be made available to each user. For example, the first print job may not be available to the second user according to the second policy. The determination of access may relate to what print jobs are available to the users over public domain 110.

Step 926 executes by generating first and second job tokens, such as job token 510, based on the first and second policies at public policy server 112. A first job token is generated for the first policy and a second job token for the second policy. In some embodiments, the first job token may be sent to private job server 126 and the second job token may be sent to private job server 136. The different private job servers are in separate private domains. Alternatively, the job tokens may be sent to private job server 126 or 136.

Step 928 executes by retrieving a first job list, such as job list 511, based on the first policy and the received first job token and retrieving the second job list, such as job list 511, based on the second policy and the received second job token. The applicable private job server or servers provide the job lists to public policy server 112. The first user may select a first print job from the first print job list. The second user may select a second print job from the second print job list. These requests are communicated back to the application private job server or servers. The binary data for the first and second print jobs are sent to public file server 114.

Step 930 executes by generating confirmation tokens, such as confirmation token 514, at public policy server 112 to indicate that the print jobs may be processed at printing device 104. Public policy server 112 may confirm that each user has enough funds in his/her account to perform operations on printing device 104, as disclosed above. A first confirmation token for the first print job is presented to public file server 114. A second confirmation token for the second print job is presented to public file server 114. Public file server 114 provides the binary data for each print job to public policy server 112. Step 932 executes by sending the binary data for the first and second print jobs to printing device 104.

Figure 10:
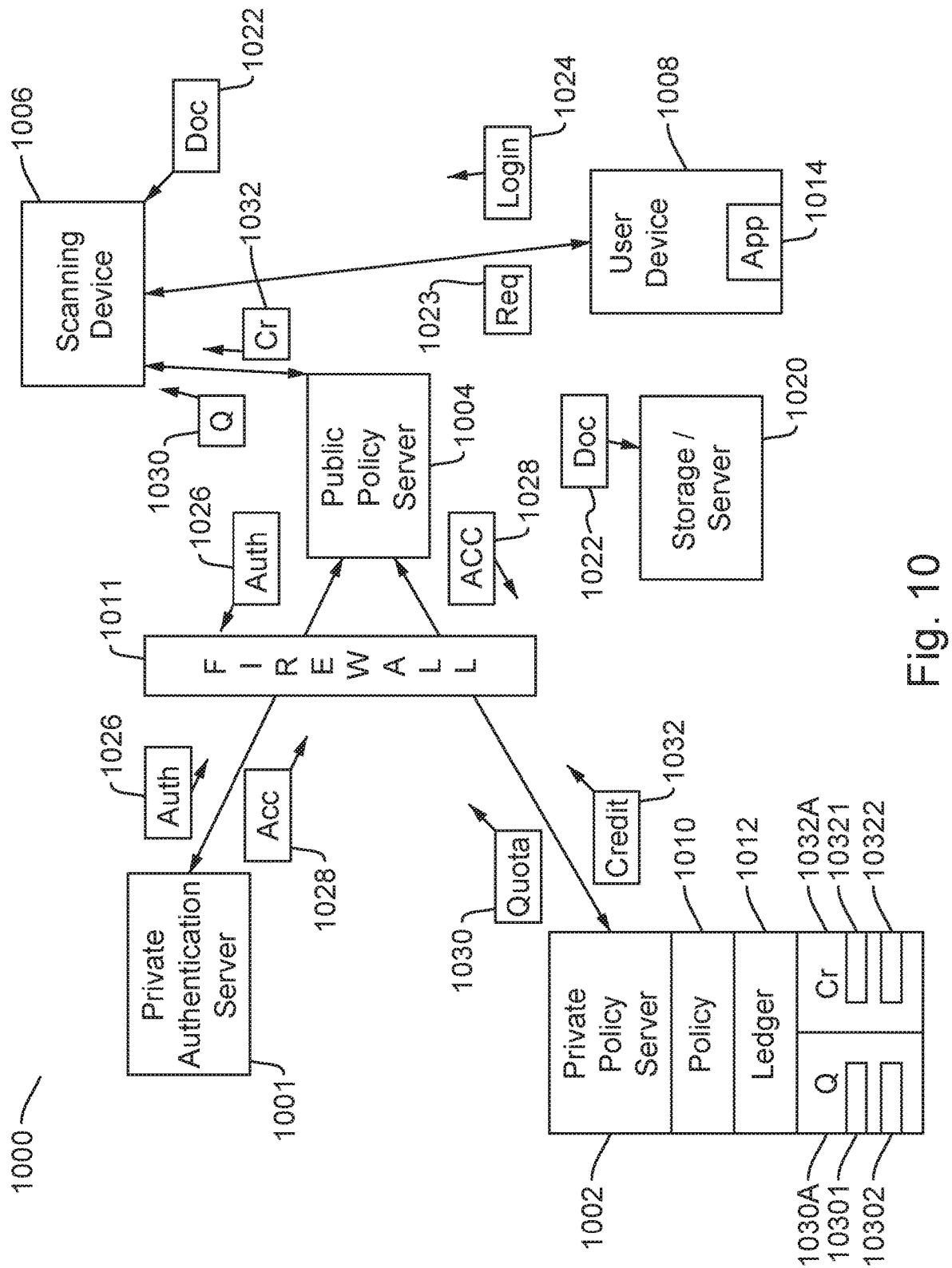
FIG. 10 illustrates a policy-based system to implement policy-based scanning operations according to the disclosed embodiments.

FIG. 10 illustrates a policy-based system 1000 to implement policy-based scanning operations according to the disclosed embodiments. System 1000 includes a scanning device 1006 that exchanges data with public policy server 1004, which corresponds to public policy server 112 disclosed above. Scanning device 1006 may resemble printing device 104 disclosed above. In some instances, scanning device 1006 is a printing device having scanning functions. Scanning device 1006 may scan documents, such as document 1022.

System 1000 also includes private authentication server 1001 and private policy server 1002, which correspond to private authentication server 124 and private policy server 128, respectively, disclosed above. Both servers 1001 and 1002 may connect to public policy server 1004 to perform operations to authenticate and apply a policy to a scanning operation at scanning device 1006 for a user. The disclosed embodiments relate to scanning as opposed to printing as some operations are different than those disclosed above by FIGS. 1-9. System 1000 also includes user device 1008 and data storage or server 1020 (hereinafter server 1020). These components of system 1000 are disclosed in greater detail below.

As noted above, some users, such as insurance and real-estate agents, sales executives, company executives, lawyers, accountants, and the like, are required to scan data outside their office environments. These users travel frequently and may be given documents or files that need to be stored or provided to their companies. These users may not be able to travel with large documents or may need to upload electronic copies of documents to their databases. Thus, a user may scan a document or file at a convenience store, an office store or kiosk, a library, another office, hotel or motel, and the like.

Many of these locations do not provide such services for free. A scanning charge may be applicable and charged to a company of the user. Users may not be charged at the scanning spot. Companies do not want excessive or unexpected scanning charges being received. A company may implement a policy to apply when a user wants to scan a document outside the office environment. Further, this policy may be kept private or stored in the private domain. The disclosed embodiments enable a policy-based scanning system to authenticate and scan an image file of a document based on a scan policy defined in the private domain.

FIG. 10 includes user device 1008. User device 1008 may be a mobile device, such as a mobile phone, tablet, laptop, and the like. A user uses user device 1008 to send information and data to scanning device 1006 or public policy server 1004. For example, user device 1008 sends log in, or authentication, information 1024 to scanning device 1006. Authentication information may include a user name, password, personal identification number (PIN), and the like. In other embodiments, the user may enter this information onto scanning device 1006 or may use a kiosk to provide this information. User device 1008 also may send a request 1023 to scanning device 1006 to scan document 1022 once the user has been authenticated and policy values received. User device 1008 also may include mobile application 1014 that manages scan jobs and print jobs for the user within system 1000. Further, the user may enter his/her authentication information into mobile application 1014, which forwards it as log in information 1024 to scanning device 1006 or public policy server 1004. Scanning device 1006 forwards log in information 1024 along with the request to scan document 1022 to public policy server 1004.

Public policy server 1004 forwards the log in information with authentication token 1026 to private authentication server 1001. Authentication token 1026 may be issued by private authentication server 1001 to public policy server 1004, as disclosed above in FIG. 3 in operations 302-310. Private authentication server 1001 sends authentication token 1026 to public policy server 1004 when authenticated connection is made, or websocket connection 144 shown in FIG. 1. Further, public policy server 1004 may receive domain list 146 of the domains related to private policy server 1002 from private authentication server 1001. Public policy server 1004 determines the appropriate private domain for the user based on the received information. The public policy server then forwards the log in information with the authentication token for the private domain to private authentication server 1001.

Private authentication server 1001 authenticates the use of public policy server 1004 for the user to manage scanning operations. It sends an access token 1028 validating the request to scan document 1022 to public policy server 1004. Public policy server 1004 may store access token 1028 to correspond with the requested scan job for document 1022. Public policy server 1004 forwards access token 1022 to access policy 1010 for the user on private policy server 1002. Access token 1022 may indicate which domain applies to the user so that private policy server 1002 selects the appropriate policy to determine whether to allow the scan job.

Private policy server 1002 applies policy 1010 and uses ledger 1012 to determine the appropriate policy values for the user. In some embodiments, the policy values include quota value 1030 and credit value 1032. These values represent the amount for each parameter left for the user based on policy 1010. Quota may refer to the file size limit for scan jobs during a policy period. A policy period may be a day, week, and the like that provides the time period to determine how much printing and scanning the user may do. The user may be limited by the policy period to how much storage space can be taken by scanning documents. Quota also may refer to the number of pages that a user may scan during the policy period. Credit may refer to the cost available to charge against for scan job. As well as file sizes, the user may be limited to a budget per policy period for scanning operations.

Ledger 1012 may create entries for transactions corresponding to scan and print jobs for the user. Every time the user scans documents, an entry may be created with the file size or number of pages for the scan job plus the cost paid to the server provider of scanning device 1006. Ledger 1012 includes quota account 1030A and credit account 1032A. Ledger 1012, when tasked by private policy server 1002, will provide the accumulated and remaining values for these parameters for the user. Policy 1010 may set the initial values for each account, which are reduced by transactions performed for the user during the policy period.

For example, quota account 1030A includes entry 10301 for a scan transaction by the user. Quota value 1030 is reduced by the file size or number of pages used for the transaction. Policy 1010 may set the initial quota value as 100 megabytes (MB) for the policy period of a week. The user is limited to scanning 100 MB per week. The scan job for entry 10301 may be 10 MB, which is recorded in ledger 1012. Thus, quota value 1030 for the user is now 90 MB. When receiving the request to scan document 1022, ledger 1012 may provide quota value 90 MB to private policy server 1002. If quota value 1030 refers to the number of pages that may be scanned, then entries and accounting are done using pages already printed during the policy period to determine quota value 1030.

The same process may be used for credit value 1032. The initial credit value for the user of credit account 1032A may be 20.00. As transactions are generated for scan jobs by the user, entries are created for credit account 1032A. Entry 10321 may be for a scan job costing S3 that corresponds to entry 10301 for quota account 1030A. Thus, credit value 1032 for the user will be reduced to $17. If the user exceeds the limits placed by policy 1010 for the quota and credit values, then private policy server 1002 may deny the scan job request from public policy server 1004.

Policy 1010 also may be applied as disclosed above with regard to print jobs and printing operations. The application of the other features of policy 1010 may be disclosed above, for example, in FIG. 3. If the scan job is allowed by policy 1010 in conjunction with ledger 1012, then private policy server 1002 sends quota value 1030 and credit value 1032 as well as any other applicable policy values for scan jobs to public policy server 1004. Public policy server 1004 may store these values or perform some initial analysis based on information received from mobile application 1014 about the scan job for document 1022. In some embodiments, public policy server 1004 forwards quota value 1030 and credit value 1032 to scanning device 1006.

The user then requests that the scan job be performed. The user may send request 1023 from user device 1008, which may include some data on document 1022 to be scanned. Scanning device 1006 also may have the request entered thereon and document 1022 placed on the device to be scanned. Scanning device 1006 then determines the quota value and the credit value for the scan job. These values are compared to quota value 1030 and credit value 1032 received from private policy server 1002 through public policy server 1004. If the values for the scan job are within the amounts provided for the quota and credit values, then scanning device 1006 will proceed with the scan job and execute scanning operations. If the values exceed the amounts provided for the quota and credit values, then the scan job is cancelled. An alert may be sent to mobile application 1014 to indicate that not enough file size or credit is available. If not enough credit is available to scan document 1022, then the user may be asked to pay at scanning device 1006.

A successful scan job generates an image file of document 1022. For illustrative purposes, this image file may be referred to document 1022 within system 1000. Document 1022 is captured by scanning device 1006. The image file may be sent to server 1020 to be stored for later retrieval by the user. Server 1020 may be indicated by an email address for scanned documents to be sent for the user. The image file also may be sent to public policy server 1004, which then may forward it to a private job server in the private domain, such as private job server 126. The document may be stored at the private job server for retrieval in the private domain. In some embodiments, the image file may be sent to an online storage account as server 1020.

Scanning device 1006 also generates statistics for the quota values and credit values for the scan job of document 1022. These statistics may be sent to public policy server 1004, which may store the statistics or forward them to user device 1008 for storing by mobile application 1014. Mobile application 1014 also may keep transaction information like ledger 1012 for the user to prevent scan requests that will be denied and to let the user know how much file size, pages, or credit is available. Public policy server 1004 sends the statistics to private policy server 1002. Ledger 1012 is updated and creates entry 10302 for the scan job of document 1022. The quota value is reduced accordingly. Credit account 1032A does the same using entry 10322 to reduce the credit value available to the user.

Figure 11:
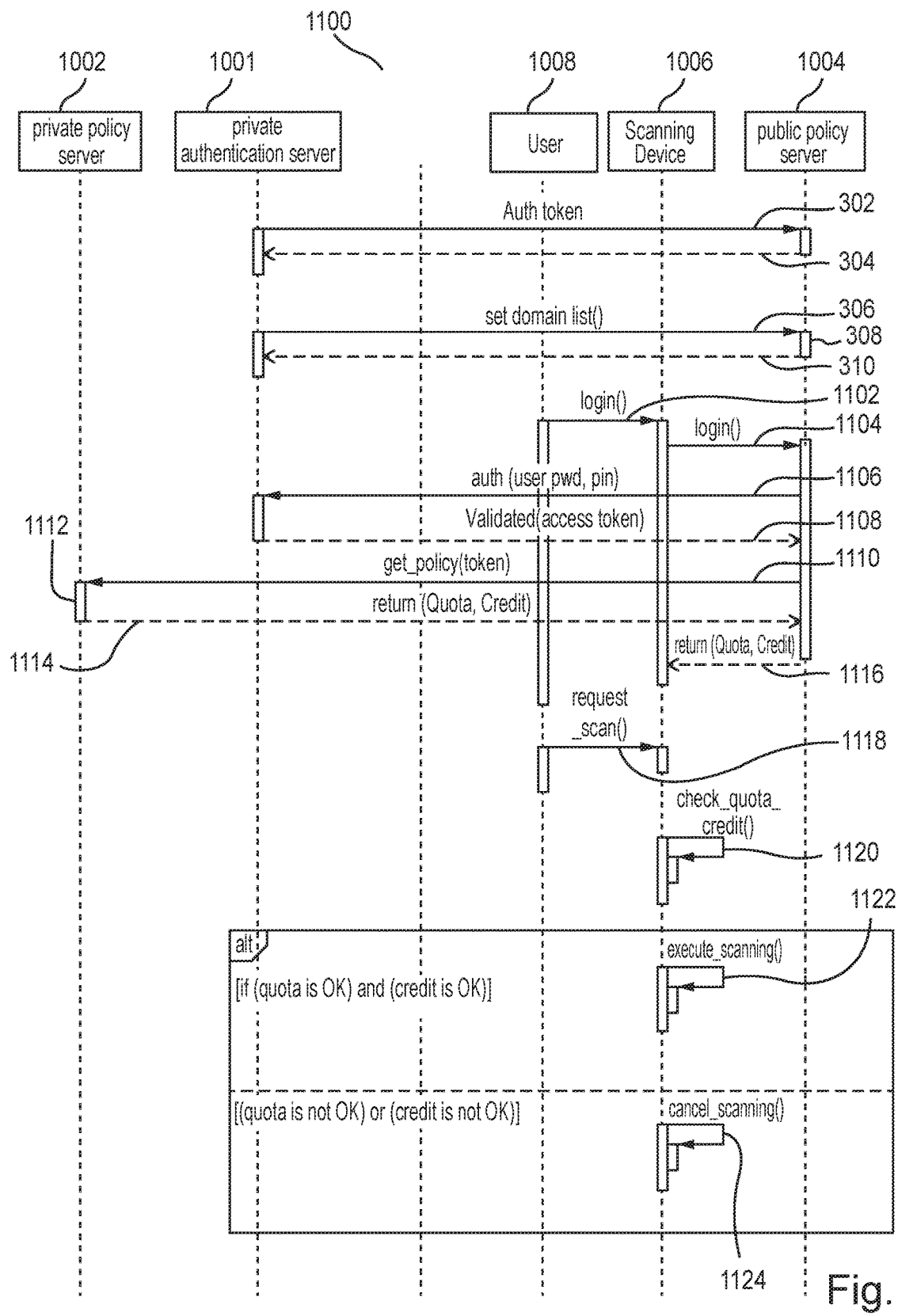
FIG. 11 illustrates a flow diagram for scanning a document at a scanning device in the policy-based system according to the disclosed embodiments.

FIG. 11 depicts a flow diagram 1100 for scanning document 1022 at scanning device 1006 in policy-based system 1000 according to the disclosed embodiments. Flow diagram 1100 may refer to FIGS. 1-10 for illustrative purposes. The embodiments disclosed by flow diagram 1100, however, are not limited to the features of FIGS. 1-10. Operations 302, 304, 306, and 310 and action 308 may execute as disclosed above in FIG. 3. Public policy server 1004 may be provided with authentication token 1026 after establishing the connection with private authentication server 1001. When establishing a session with private policy server 1002, public policy server 1004 may send an authentication token 1026 to private authentication server 1001.

Operation 1102 executes by the user providing log in credentials or information to scanning device 1006. In some embodiments, the user may transmit log in information 1024 to scanning device 1006 from user device 1008. The user may enter the information into mobile application 1014 and send it to the scanning device. Log in information may be a user name/email account, password, PIN, and the like. Operation 1104 executes by sending the log in information to public policy server 1004 from scanning device 1006. In other embodiments, log in information 1024 may be sent to public policy server 1004 from mobile application 1014.

Operation 1106 executes by sending authentication token 1026 to private authentication server 1001. The appropriate domain for the user may be determined by the email address associated with the log in information. Public policy server 1004 checks domain list 146 provided by private authentication server 1001, as disclosed above. It then determines the appropriate private policy server to query for a possible scan job for the user. Authentication token 1026 is sent to the appropriate private domain. Operation 1108 executes by validating public policy server 1004 to access private policy server 1002 with access token 1028. Public policy server 1004 receives access token 1028 from private authentication server 1001 for the appropriate private policy server having the policy for the user. Public policy server 1004 stores access token 1028.

Operation 1110 executes by getting the policy values for policy 1010 of the user. Public policy server 1004 sends access token 1028 to private policy server 1002. Private policy server 1002 confirms that access token 1028 is valid and corresponds to policy 1010. Public policy server 1004 also may send a request for performing a scan job for document 1022 on scanning device 1006. This causes private policy server 1002 to perform action 1112. As disclosed above, private policy server 1002 applies policy 1010 to determine the information needed to determine the scanning operations may be executes. Policy 1010 may set forth limits on the file size of scan jobs, number of pages scanned, and costs accumulated for the policy period. Private policy server 1002 also analyzes ledger 1012 to determine quota value 1030 or credit value 1032 for the user account. Operation 1114 executes by returning these values to public policy server 1004.

Public policy server 1004 may store quota value 1030 and credit value 1032. It also may forward these values to mobile application 1014 to update the user on how much file size, pages, or credit that he/she has left for the policy period. Operation 1116 executes by sending quota value 1030 and credit value 1032 to scanning device 1006. These values may be stored on scanning device along with some indication that they correspond to the user. The user may be prompted to enter a code at scanning device 1006 to retrieve the values before scanning document 1022. The code may be sent to mobile application 1014 by public policy server 1004 or scanning device 1006.

Operation 1118 executes by requesting document 1022 be scanned on scanning device 1006. In some embodiments, a request 1023 may be sent to scanning device 1006 to scan document 1022. In some embodiments, scanning device 1006 may query public policy server 1004 for quota values 1030 and credit values 1032. For example, once the user identifies the appropriate domain, the values are provided to scanning device 1006. Operation 1120 executes by checking quota value 1030 and credit value 1032 to determine whether document 1022 may be scanned at scanning device 1006. In some embodiments, scanning device 1006 performs this function. In other embodiments, public policy server 1004 may determine whether scanning operations may proceed according the values from private policy server 1002.

Depending on the results of the determination in operation 1120, flow diagram 1100 proceeds to operation 1122 or 1124. If the quota value and the credit value for the scan job of document 1022 are acceptable, then operation 1122 executes by scanning document 1022. Scanning device 1006 executes scanning operations. An image file of document 1022 is generated at scanning device 1006. The image file may be forwarded to a destination address set by the user or by policy 1010, such as server 1020 or a private job server. In some embodiments, scanning device 1006 is not directly connected to a private job server and may not be certain of the IP address of any servers in the private domain. In other embodiments, the image file may be sent to user device 1008.

If the quota value or the credit value for the scan job are not acceptable, then operation 1124 executes by cancelling the scanning operations by scanning device 1006. An alert may be sent to mobile application 1014 to notify the user. Scanning device 1006 also may alert the user and send a notice to public policy server 1004. Public policy server 1004 may set a status for the user that further scan jobs are not allowed, unless cleared by an administrator through private policy server 1002.

Figure 12:
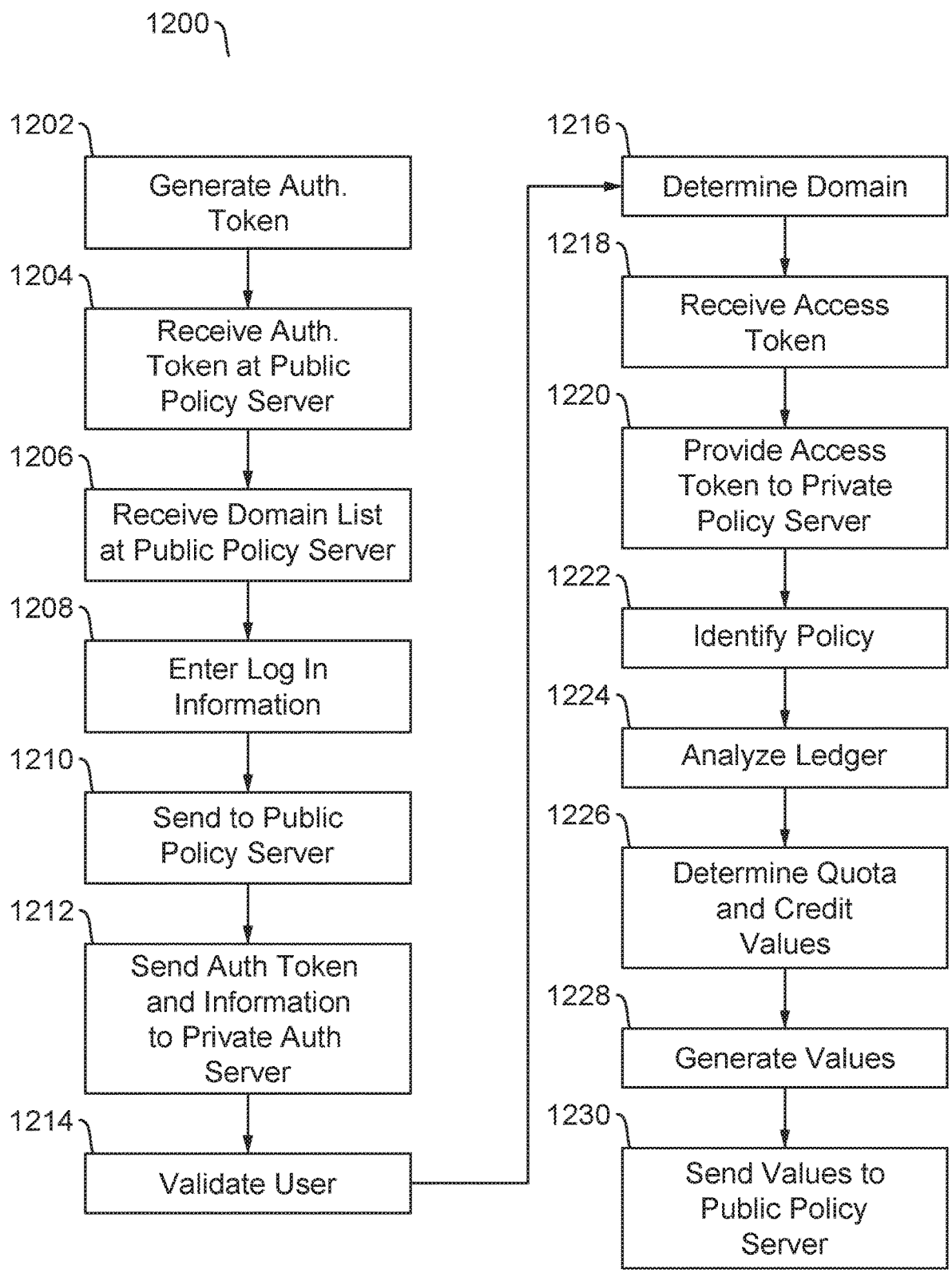
FIG. 12 illustrates a flowchart for using a scanning device in the policy-based system according to the disclosed embodiments.

FIG. 12 depicts a flowchart 1200 for applying a policy 1010 for scanning a document 1022 in policy-based system 1000 according to the disclosed embodiments. Flowchart 1200 may refer to FIGS. 1-11 for illustrative purposes. The embodiments disclosed by flowchart 1200, however, are not limited by the features shown in FIGS. 1-11.

Step 1202 executes by generating authentication token 1026 at private authentication server 1001. Authentication token 1026 may be a data string that indicates to private authentication server 1001 that public policy server 1004 is authenticated and connected thereto. Step 1204 executes by receiving authentication token 1026 at public policy server 1004 from private authentication server 1001. Public policy server 1004 may acknowledge receipt of authentication token 1026 back to private authentication server 1001.

Step 1206 executes by receiving a domain list, such as domain list 146 disclosed above, at public policy server 1004 from private authentication server 1001. The domain list may identify the appropriate domains associated with private authentication server 1001 and private policy server 1002. Public policy server 1004 may determine which domain to query when approving scanning operations at connected scanning devices.

Step 1208 executes by entering log in information 1024 at scanning device 1006. Log in information 1024 may be entered by the user directly to scanning device 1006. Alternatively, user device 1008 may send the information in electronic form to scanning device 1006. Mobile application 1014 may store the information to provide it as log in information 1024 over system 1000. Log in information 1024 may include authentication information for the user, such as user name, email address, password, PIN, and the like. Step 1210 executes by sending log in information 1024 to public policy server 1004 from scanning device 1006. Alternatively, mobile application 1014 may forward log in information 1024 directly to public policy server 1004 in order to begin determination of a scan job without necessarily being at scanning device 1006.

Step 1212 executes by sending authentication token 1026 and log in information 1024 including any authentication information to private authentication server 1001 from public policy server 1004. Step 1214 executes by validating the user at private authentication server 1001 using the received token and information. Private authentication server 1001 verifies that public policy server is acceptable to manage a scan job for the user. It also may verify that the user is associated with a domain in the domain list. Step 1216 executes by determining the private domain associated with the user based on log in information 1024.

Step 1218 executes by receiving access token 1028 at public policy server 1004 from private authentication server 1001. Private authentication server 1001 generates access token 1028 for public policy server 1004 to use with private policy server 1002. Public policy server 1004 stores access token 1028. Access token 1028 may be associated with the user at public policy server 1004. Step 1220 executes by providing access token 1028 to private policy server 1002 from public policy server 1004. Public policy server 1004 may send access token 1028 after the user logs into scanning device 1006. Alternatively, public policy server 1004 may send access token 1028 after the user requests a scan job.

Step 1222 executes by identifying policy 1010 for the user based on access token 1028. Access token 1028 may identify the domain for the user. Private policy server 1002 uses this information to select the appropriate policy to apply to a scan job for the user. Further, private policy server 1002 may use this information to identify an account for the user in ledger 1012. Step 1224 executes by analyzing the user account in ledger 1012. As disclosed above, ledger 1012 includes entries for the status of the quota value and the credit value for the user. Ledger 1012 may determine the accumulated amounts used for the policy period for these values.

Step 1226 executes by determining quota value 1030 and credit value 1032 based on policy 1010 and the entries recorded in ledger 1012. Policy 1010 may set forth the maximum values for these parameters. As policy 1010 may change or be updated at private policy server 1002, the parameters for the quota value and the credit value should be applied when a determination is made. Ledger 1012 may not be updated with the maximum values and may provide the accumulated values for these parameters. Step 1228 executes by generating quota value 1030 and credit value 1032, as disclosed above. The values accumulated for the policy period in ledger 1012 may be subtracted from the maximum values for the parameters set forth in policy 1010. The results are used for quota value 1030 and credit value 1032. Other policy values also may be generated by private policy server 1002.

Step 1230 executes by sending quota value 1030 and credit value 1032 to public policy server 1004 from private policy server 1002. In some embodiments, values 1030 and 1032 also may be sent to mobile application 1014 so that the user may know the amounts left on his account for scanning operations. If the user knows that the scan job for document 1022 will exceed the values from private policy server 1002, then he/she may cancel the scan job. Public policy server 1004 may store quota value 1030 and credit value 1032 until requested to send these values to scanning device 1006.

Figure 13:
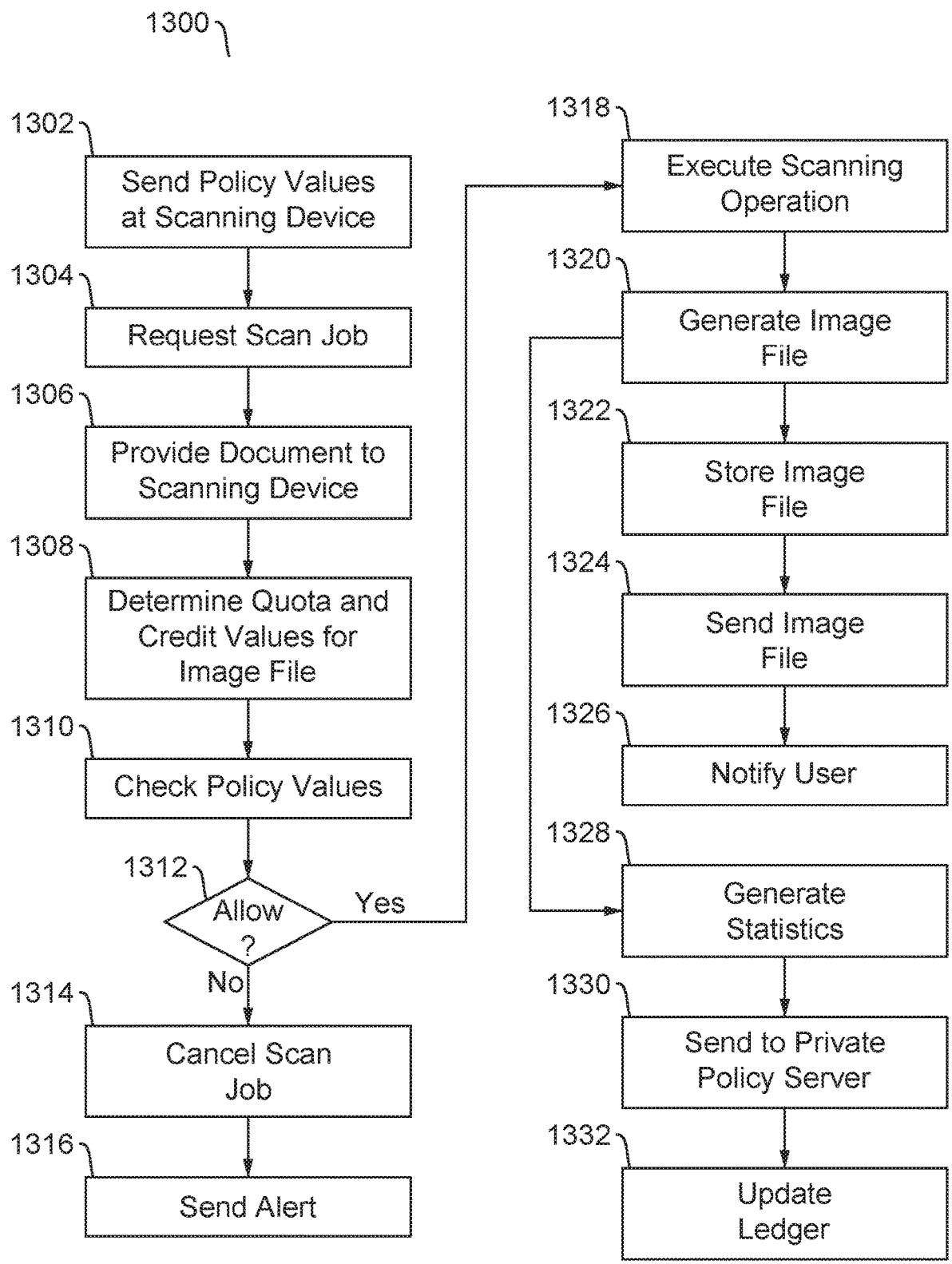
FIG. 13 illustrates a flowchart for scanning a document at the scanning device according to the disclosed embodiments.

FIG. 13 depicts a flowchart 1300 for scanning a document 1022 at scanning device 1006 according to the disclosed embodiments. Flowchart 1300 may refer to FIGS. 1-12 for illustrative purposes. The embodiments disclosed by flowchart 1300, however, are not limited by the features shown in FIGS. 1-12.

Step 1302 executes by sending quota value 1030 and credit value 1032 to scanning device 1006 from public policy server 1004. Scanning device 1006 may store the values and associate them with the user that logged into the device earlier. In some embodiments, after sending log in information 1024, scanning device 1006 may wait for receipt of the policy values before commencing further operations. Step 1304 executes by requesting the scan job for document 1022 by the user. The user may input the request at scanning device 1006 or send request 1023 from user device 1008. Mobile application 1014 may be used to generate and send request 1023.

Step 1306 executes by providing document 1022 to scanning device 1006. For example, document 1022 may be placed onto scanning device 1006. Step 1308 may execute in some embodiments by determining quota and credit values for the image file for document 1022. Scanning device 1006 may perform a preliminary operation to determine the probable values for executing the scan job. For example, scanning device 1006 may determine the number of pages for document 1022 and the potential cost. Step 1310 executes by checking the policy values, or quota value 1030 and credit value 1032, received from public policy server 1004.

Step 1312 executes by determining whether to allow scanning operations on scanning device to scan document 1022. The disclosed embodiments compare the scan job value to see if they can be allowed using quota value 1030 and credit value 1032. The disclosed embodiments determine whether quota value 1030 will not be exceeded by the size or number of pages for the image file of document 1022. The disclosed embodiments also determine whether the cost for the scan job will exceed credit value 1032 of the money remaining available to the user. Preferably, both values are checked. If either value does not accept the values of the scan job, then step 1312 may be no. To proceed with the scanning operations, the scan job may be within the limits imposed by quota value 1030 and credit value 1032.

If step 1312 is no, then step 1314 executes by cancelling the scan job on scanning device 1006. Document 1022 is not scanned. Step 1316 executes by sending an alert to the user, such as using user device 1008. Alternatively, the alert may be displayed at scanning device 1006. An alert also may be sent to public policy server 1004 to note that further requests from the user may be denied. The user at this time may be presented the option of paying for the scan job at scanning device 1006 or at a kiosk connected to the scanning device.

If step 1312 is yes, then step 1318 executes by executing scanning operations using scanning device 1006. Document 1022 is scanned. Step 1320 executes by generating an image file of document 1022. The data of document 1022 is captured by scanning device 1022. The image file is generated which represents the data, such text and graphics, in document 1022. The image file may be referred to as the electronic document of document 1022.

Step 1322 executes by storing the image file of document 1022. Preferably, the image file is stored at scanning device 1006. In some embodiments, the image file of document 1022 is stored for a set amount of time, such as 10 minutes, before the image file is removed from the device. This feature allows scanning device 1006 to clear its memory and resources for future scan jobs by not storing every scanning operation until a manual erase is performed. Further, it prevents sensitive documents from being stored on scanning device 1006 so that it may be accessed by another party. In other embodiments, the stored image file may be used for printing the scanned document. The image file may be retrieved from storage on scanning device 1006 to print a copy of document 1022. Another copy may be stored on public policy server 1004 or on other components within system 1000.

Step 1324 executes by sending the image file of document 1022 to a location within system, such as server 1020 or user device 1008. The user may input an email address to which to send the image file. Server 1020 may host a storage account, such as a Gmail™ account, that stores the image file for retrieval later by the user. Alternatively, the user may send the image file of document 1022 to a work email hosted on a server in the private domain. In some embodiments, the image file may be directed to a private job server associated with private policy server 1002. In any event, the image file is sent from scanning device 1006. The image file then may be deleted from scanning device 1006. In other embodiments, the image file of document 1022 is sent to user device 1008. The image file also may be sent to any cloud-storage device or server separate from the components disclosed above. Step 1326 executes by notifying the user that the scan job is complete. An alert may be displayed on scanning device 1006 or a message received at mobile application 1014.

After step 1320, other steps are executed to update the user's account at private policy server 1002. Thus, flowchart 1300 proceeds to step 1328, which executes by generating statistics for the scan job, such as a quota value and a credit, or cost, value determined by scanning device 1006. Step 1330 executes by sending the statistics including the values to private policy server 1002 through public policy server 1004. Scanning device 1006 is not connected directly to servers in the private domain. Private policy server 1002 receives the quota value and the credit value for the scan job and correlates them to the user's account in ledger 1012. Step 1332 executes by updating ledger 1012 with the statistics. Entries may be made into quota account 1030A and credit account 1032A for the user. The accumulated quota value and credit value may be updated with the results of the scan job.

Thus, the disclosed embodiments may apply a policy to print and scan jobs within a policy-based system. The processes to approve these jobs differ in how the policies are used. For example, a job list may not be provided for a scan job as the user is not selecting a document from the private job server. Instead, the user is creating an image file that is approved using the parameters set forth in the policy. The user does not need to know the particulars of the policy and determinations may be performed in the private domain.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more multi-functional printer (MFP) systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A policy-based scanning method comprising:
   generating at least one policy value according to a policy stored at a private policy server, wherein the policy corresponds to a user of a scanning device;
   sending the at least one policy value to a public policy server connected to the private policy server;
   requesting a scan job for a document at the scanning device connected to the public policy server;
   determining whether the scan job is allowed according to the at least one policy value;
   executing a scanning operation for the document at the scanning device if the scan job is allowed;
   generating an image file of the scanned document; and
   storing the image file of the scanned document.

2. The policy-based scanning method of claim 1, further comprising not executing the scanning operation if the scan job is not allowed.

3. The policy-based scanning method of claim 1, wherein generating the at least one policy value includes generating a quota value.

4. The policy-based scanning method of claim 1, wherein generating the at least one policy value includes generating a credit value.

5. The policy-based scanning method of claim 1, wherein generating the at least one policy value includes analyzing a ledger on the private policy server.

6. The policy-based scanning method of claim 1, further comprising providing an access token to the private policy server from the public policy server, wherein the at least one policy value is generated in response to the access token.

7. The policy-based scanning method of claim 6, further comprising receiving the access token at the public policy server from a private authentication server.

8. The policy-based scanning method of claim 7, further comprising generating the access token at the private authentication server upon receipt of authentication information from the public policy server.

9. The policy-based scanning method of claim 8, wherein the authentication information includes an authentication token generated by the private authentication server.

10. The policy-based scanning method of claim 1, further verifying the user at the scanning device using the public policy server.

11. A policy-based scanning method comprising:
    authenticating a user at a scanning device connected to a public policy server using a private authentication server;
    receiving an access token at the public policy server from the private authentication server based on the authentication of the user;
    providing the access token to a private policy server from the public policy server;
    generating at least one policy value for a scanning operation at the private policy server, wherein the at least one policy value is based on a policy corresponding to the user;
    receiving the at least one policy value at the public policy server;

receiving a request for the scanning operation at the scanning device;

determining whether to allow the scanning operation of a document according to the at least one policy value; and executing the scanning operation at the scanning device.

12. The policy-based scanning method of claim 11, wherein generating the at least one policy value includes generating a quota value or a credit value.

13. The policy-based scanning method of claim 11, further comprising generating an image file of the document based on the scanning operation.

14. The policy-based scanning method of claim 13, further comprising storing the image file of the document.

15. The policy-based scanning method of claim 13, further comprising sending the image file to a private job server.

16. The policy-based scanning method of claim 11, wherein the authenticating includes providing an authentication token at the private authentication server from the public policy server.

17. A policy-based scanning system configured to:

generate at least one policy value according to a policy stored at a private policy server, wherein the policy corresponds to a user of a scanning device;

send the at least one policy value to a public policy server connected to the private policy server;

request a scan job for a document at the scanning device connected to the public policy server;

determine whether the scan job is allowed according to the at least one policy value;

execute a scanning operation for the document at the scanning device if the scan job is allowed;

generate an image file of the scanned document; and store the image file of the scanned document.

18. The policy-based scanning system of claim 17, wherein the at least one policy value is a quota value or a credit value.

19. The policy-based scanning system of claim 17, wherein the private policy server includes a ledger used to determine the at least one policy value.

20. The policy-based scanning system of claim 17, wherein the server corresponds to an email account.

\* \* \* \* \*